(12) United States Patent
Braier

(10) Patent No.: US 10,859,276 B2
(45) Date of Patent: Dec. 8, 2020

(54) WATER HEATING SYSTEM WITH SMART BOILER AND METHOD THEREOF

(71) Applicant: SMART GLOBAL B. ENERGY LTD, Mizpe Ramon (IL)

(72) Inventor: Aharon Braier, Mizpe Ramon (IL)

(73) Assignee: Smart Global B. Energy Ltd, Mizpe Ramon (IL)

(*) Notice: Subject to any disclaimer, the term of this patent is extended or adjusted under 35 U.S.C. 154(b) by 65 days.

(21) Appl. No.: 16/091,771

(22) PCT Filed: Apr. 4, 2017

(86) PCT No.: PCT/IL2017/050406
§ 371 (c)(1),
(2) Date: Oct. 5, 2018

(87) PCT Pub. No.: WO2017/175220
PCT Pub. Date: Oct. 12, 2017

(65) Prior Publication Data
US 2019/0107293 A1 Apr. 11, 2019

Related U.S. Application Data

(60) Provisional application No. 62/318,238, filed on Apr. 5, 2016.

(51) Int. Cl.
*F24H 1/32* (2006.01)
*F24D 17/00* (2006.01)
(Continued)

(52) U.S. Cl.
CPC ....... *F24D 17/0057* (2013.01); *F24D 17/001* (2013.01); *F24D 17/0031* (2013.01);
(Continued)

(58) Field of Classification Search
CPC ..... F24H 1/32; F24H 1/38; F24H 1/48; F23B 2700/01; F23B 31/00
See application file for complete search history.

(56) References Cited

U.S. PATENT DOCUMENTS 3,349,755 A * 10/1967 Miller ...................... F24H 1/145
122/13.3
3,383,495 A 5/1968 Laube et al.
(Continued)

FOREIGN PATENT DOCUMENTS

CN 86210945 U 10/1987
CN 2270726 Y 12/1997
(Continued)

OTHER PUBLICATIONS

The International Bureau of WIPO, International Preliminary Report on Patentability in International Application No. PCT/IL2017/050406 (dated Oct. 9, 2018) (6 pages).
(Continued)

*Primary Examiner* — Gregory A Wilson
(74) *Attorney, Agent, or Firm* — Neal, Gerber & Eisenberg LLP; Thomas E. Williams; Daniel L. Organ

(57) ABSTRACT

A system and method for providing hot water to a point of use such as a shower. Waste warm water from said point of use passes through a heat exchanger, where it initially warms incoming mains water, typically to about 34° C. The initially warmed water is heated to its final temperature, typically about 42° C., in a smart boiler. The smart boiler, which typically has a volume of about 40 liters, comprises two chambers with a flexible barrier therebetween. Each chamber is separately heated as needed. Hot water is drawn from one of the two chambers; simultaneously, the other chamber fills with initially warmed water and is heated to its final temperature. When the volume of water in the chamber from
(Continued)

which water is being drawn reaches a minimum, the system begins to fill that chamber and to draw water from the other one.

17 Claims, 5 Drawing Sheets

(51) Int. Cl.
  *F24D 19/10* (2006.01)
  *F24H 1/18* (2006.01)
  *F28D 20/00* (2006.01)

(52) U.S. Cl.
  CPC ......... *F24D 19/10* (2013.01); *F24D 19/1063* (2013.01); *F24D 19/1069* (2013.01); *F24D 19/1072* (2013.01); *F24H 1/185* (2013.01); *F24D 2200/20* (2013.01); *F24D 2220/0207* (2013.01); *F24D 2220/08* (2013.01); *F24D 2240/00* (2013.01); *F28D 2020/0091* (2013.01)

(56) References Cited

U.S. PATENT DOCUMENTS

| | | | |
|---|---|---|---|
| 7,458,418 | B2 | 12/2008 | Sienel |
| 8,997,511 | B2 | 4/2015 | Berrio |
| 2005/0218240 | A1 | 10/2005 | Sienel |
| 2012/0067300 | A1 | 3/2012 | Berrio |
| 2016/0161148 | A1* | 6/2016 | Honeycutt .......... F24D 19/1021 |
| | | | 122/14.3 |

FOREIGN PATENT DOCUMENTS

| | | |
|---|---|---|
| CN | 2381946 Y | 6/2000 |
| CN | 1299458 A | 6/2001 |
| CN | 103791625 A | 5/2014 |
| CN | 106287651 A | 1/2017 |
| EP | 0663576 A1 | 7/1995 |
| ES | 1074419 U | 4/2011 |
| WO | 2017/175220 | 10/2017 |

OTHER PUBLICATIONS

Israel Patent Office, International Search Report in International Application No. PCT/IL2017/050406 (dated Jul. 6, 2017) (3 pages).
Israel Patent Office, Written Opinion of the International Search Authority in International Application No. PCT/IL2017/050406 (dated Jul. 6, 2017) (5 pages).
European Patent Office, European Search Report in Application No. 17778791.8 (dated Oct. 2, 2019) (8 pages).

* cited by examiner

WATER HEATING SYSTEM WITH SMART BOILER AND METHOD THEREOF

REFERENCE TO RELATED PUBLICATION

This application claims priority from U.S. Provisional Pat. Appl. No. 62/318,238, filed 5 Apr. 2016.

FIELD OF THE INVENTION

This invention relates in general to systems and methods for heating water. It relates in particular to systems and methods primarily for home use that comprise a preliminary heating stage in which incoming mains water is heated by heat exchange from waste warm water followed by a second heating stage in which water is further heated in a multi-chamber boiler located near the point of use.

BACKGROUND OF THE INVENTION

Home water heating systems tend to suffer from numerous sources of inefficiency. For example, the water is generally heated at a location remote from its final point of use, particularly in the case of water heating systems that use solar-heated boilers. Because of the distance between the point at which the water is heated and the point at which it is used, there is a significant waste of water, as the pipes must first be emptied of the residual water within them before hot water from the water heater can arrive at the point of use, and the pipes must be warmed by the water flowing through them so that the water arriving at the point of use will not have cooled down to an unacceptable temperature on its journey from the heater. Thus, there is generally a significant waste of water and energy associated with the transport of the water from the heating source to the point of use.

In addition, much of the energy used to heat the water is wasted because the water leaving the system is generally cools by only a few degrees during its use, so most of the waste water drained from the system (greywater or blackwater) is still significantly warmer than the fresh water entering. Thus, most of the energy used to heat the water is in effect wasted.

One general approach to solving this problem has been to use the heat contained in the waste water as a source of heat for the incoming cold mains water, by passing the waste water (greywater or blackwater) and the incoming mains water through a heat exchanger, thereby warming the incoming mains water to within 10° C. of the temperature desired at the point of use.

The general concept of using heat transfer from warm greywater to heat incoming cold water goes back at least to U.S. Pat. No. 1,790,828, which was granted in 1931. This patent discloses a method for heating water for washing clothes that comprises passing the used hot water through a heat exchanger in which it comes into thermal contact with incoming cold water, thereby heating the cold water.

U.S. Pat. Nos. 4,300,247 and 4,398,308 disclose an apparatus and method, respectively, for decreasing the energy consumed by shower baths, in which a heat exchanger is used to preheat incoming cold water with hot water from the drain, followed by use of a local water heater to elevate the temperature of the hot water feed to its final temperature of >75° C. The patents assert an energy savings of at least 50%. Similar systems in which partially heated water is heated to its final temperature in a standard boiler are disclosed in U.S. Pat. Nos. 4,150,787, 4,304,292, 4,372,372, and 8,104,532, British Pat. No. GB1574327, and British Pat. Appl. No. GB2416829.

Systems are also known in which partially heated water is brought to its final temperature by an in-line heater ("rapid" or "instant" heater). Examples of patent documents that disclose such systems include British Pat. Appl. Nos. GB2052698, GB2160628, GB2385785, and GB2494609; and British Pat. Nos. GB2376517 and GB2457394.

British Pat. Appl. No. GB2442801 discloses a shower system that preheats incoming cold water by heat exchange from warm greywater and then passes the preheated water to one or both of a boiler (immersion heater) and an in-line rapid heater connected in series with the boiler. In order to limit the maximum instantaneous electricity use, the system is designed such that only one of the boiler and the in-line heater can operate at any given time. The application only discloses electric heating of the water in the boiler and in-line heater. The outlet of the boiler may include a filter.

International (PCT) Pat. Appl. Pub. No. WO2011/146962 discloses a shower system in which incoming cold water is preheated by heat exchange from warm greywater and then heated to its final temperature either in a boiler or by an in-line heater connected in series with the boiler. The in-line heater only operates if the water exiting the boiler is below a predetermined value. The boiler may be gas or solar operated.

International (PCT) Pat. Appl. Pub. No. WO2015/173400 discloses a shower system in which incoming cold water is preheated by heat exchange from warm greywater. Under normal use, the preheated water is brought to its final temperature by an in-line heater. In order to reduce the boot time for the system, it includes a second heater in which water can be stored and held at a predetermined temperature so that hot water can be dispensed immediately upon startup of the system.

While these systems provide approaches to increasing the energy and water efficiency of the water heating system by using heat contained in the warm greywater to partially heat incoming mains water, they do not provide optimal solutions to the problem that further heating is still necessary in order to bring the partially heated water to its final temperature. They rely on a boiler remote from the point of use, a boiler that is larger than is needed to provide sufficient water for the immediate use, or on an in-line heater that may not be able to heat the water passing to the point of use sufficiently quickly to provide a continuous supply of water at the desired temperature and flow rate.

Thus, a water heating system that uses heat from warm greywater to partially heat incoming cold mains water and then heats the water to its desired final temperature in a way that is both water and energy efficient remains a long-felt, but as yet unmet, need.

SUMMARY OF THE INVENTION

The present invention is designed to meet this long-felt need. It some embodiments, it comprises a "smart boiler" that is divided into at least two chambers by a flexible barrier. In typical non-limiting embodiments of the smart boiler, it is located near the point of use, and has a volume commensurate with the amount needed for a single use, typically around 40 liters. As water is withdrawn from the first chamber, water is introduced into the second, and the flexible barrier moves toward the first chamber. The water in the second chamber is heated to its final temperature while water is being withdrawn from the first chamber. Since the water being added to the boiler does not mix with water flowing out of the boiler from the other chamber, the water flowing out of the boiler remains at a constant temperature during the entire time that water is being supplied from a particular chamber. When the volume in the first chamber reaches a preset minimum, the direction of flow is reversed, and the first chamber fills and the water therein is heated while the second chamber empties. The smart boiler system of the present invention is described in detail below.

In some embodiments of the invention, the smart boiler is incorporated into a water heating system that comprises a heat exchanger that uses warm greywater being drained from the system to heat incoming cold mains water. The smart boiler takes the partially-heated water and further heats it to a final desired temperature. The water heating system is described in detail below.

In some embodiments of the invention, the smart boiler is incorporated into a system for heating water and delivering it to a point of use, as described in detail below.

It is therefore an object of this invention to disclosed a smart boiler system, comprising:

a first chamber (410) comprising a first inlet (4510), a second inlet (4515), a first outlet (4100), and a second outlet (4150);

a second chamber (420) comprising a first inlet (4520), a second inlet (4525), a first outlet (4200), and a second outlet (4250);

a first non-return valve (730) comprising an inlet in fluid connection with said second outlet (4250) of said second chamber (420) and an outlet in fluid connection with said second outlet (4150) of said first chamber (410), said first non-return valve configured to open when pressure at said inlet exceeds pressure at said outlet by a predetermined amount;

a second non-return valve (740), comprising an inlet in fluid connection with said second outlet (4150) of said first chamber (410); and, an outlet in fluid connection with said second outlet (4250) of said second chamber (420); said second non-return valve configured to open when pressure at said inlet exceeds pressure at said outlet by a predetermined amount;

a flexible barrier (430) separating said first chamber and said second chamber;

a first heater (451) in thermal contact with said inlets to said first chamber;

a second heater (452) in thermal contact with said inlets to said second chamber;

a first recirculating pump (101) configured to pump fluid from said first chamber outlet (4100) to said first chamber inlet (4515) through a normally-open first valve (301) via a conduit (2070);

a second recirculating pump (102) configured to pump fluid from said second chamber outlet (4200) to said second chamber inlet (4525) through a normally-open second valve (302) via a conduit (2075);

volume detection means for determining when said flexible barrier approaches within a predetermined distance of an interior surface of a chamber selected from said first chamber and said second chamber, said volume detection means configured to provide a signal when at least one condition selected from the following group of conditions is met: (a) said flexible barrier is determined to have approached to within said predetermined distance of an interior surface of said chamber; (b) said flexible barrier is determined to have reached a predetermined limit of its travel; (c) said volume detection means determines that said chamber is characterized by a volume consistent with approach of said flexible barrier to within said predetermined distance of an interior surface of said chamber; and, (d) said volume detection means determines that one of said chambers is effectively empty;

a normally closed third valve (303), one side of which is connected to conduit (2070) via conduit (2060) at a point downstream of said first recirculating pump (101), and a second side of which is connected to conduit (2075) via conduit (2065) at a point downstream of said second recirculating pump (102);

a three-way inlet valve (304), comprising: an inlet; a first outlet in fluid connection with first chamber inlet (4510) via a conduit (2050); and a second outlet in fluid connection with second chamber inlet (4520) via a conduit (2055);

a three-way outlet valve (305), comprising: a first inlet in fluid connection with first chamber outlet (4150) via a conduit (2080); a second inlet in fluid connection with second chamber outlet (4250) via a conduit (2085); and, an outlet;

a heating control subsystem, said heating control subsystem comprising: a first temperature control means (510) configured to measure temperature within said first chamber (410) and to control said first heater (451); a second temperature control means (520) and configured to measure temperature within said second chamber (420) and to control said second heater (452); and, control means configured to set said valves (301), (302), (303), and (304) to conduct water to one of said first chamber and said second chamber in response to a signal either from said volume detection means or from a user.

It is a further object of this invention to disclose such a smart boiler system, wherein said volume detection means comprises: a first proximity sensor (441) located within said first chamber (410) and in electrical connection with a first switch (610); a second proximity sensor (442) located within said second chamber (420) and in electrical connection with a second switch (620); and, an actuator (440) attached to or embedded in said flexible barrier (430) such that when said actuator approaches to within a predetermined distance of one of said two proximity switches, said proximity switch is activated, thereby activating said switch in electrical connection therewith and sending a signal to said control means to set said valves (301), (302), (303), and (304) to conduct water to the chamber within which said proximity switch has been activated.

It is a further object of this invention to disclose such a smart boiler system, wherein said volume detection means comprises: a first pressure differential switch (445) in fluid connection with said first chamber (410) and with said second chamber (420) and in electrical connection with said control means, said first pressure differential switch configured to measure a difference between pressure inside said first chamber and said second chamber and to send a signal to said control means to set said valves (301), (302), (303), and (304) to conduct water to said first chamber if said pressure difference falls below a predetermined value; and, a second pressure differential switch (446) in fluid connection with said first chamber (410) and with said second chamber (420) and in electrical connection with said control means, said second pressure differential switch configured to measure a difference between pressure inside said second chamber and said first chamber and to send a signal to said control means to set said valves (301), (302), (303), and (304) to conduct water to said second chamber if said pressure difference falls below a predetermined value.

It is a further object of this invention to disclose a smart boiler system as defined in any of the above, wherein said first temperature control means (510) is configured to control said first recirculating pump (101) and said first valve (301), and said second temperature control means (520) is configured to control said second recirculating pump (102) and said second valve (302).

It is a further object of this invention to disclose a smart boiler system as defined in any of the above, comprising a first grid (460) disposed about said interior surface of said first chamber (410) and a second grid (465) disposed about said interior surface of said second chamber.

It is a further object of this invention to disclose a smart boiler system as defined in any of the above, comprising at least one one-way check valve selected from the group consisting of: a first check valve (701) located between said inlet valve (304) and said first chamber inlet (4510); a second check valve (702) located between said inlet valve (304) and said second chamber inlet (4520); a third check valve (703) located between said first pump (101) and said first valve (301) upstream of said connection between conduits (2060) and (2070); and, a fourth check valve (704) located between said second pump (102) and said second valve (302) upstream of said connection between conduits (2065) and (2075).

It is a further object of this invention to disclose a smart boiler system as defined in any of the above, comprising: a first pressure relief valve (710) in fluid communication with conduit (2050), configured to release pressure by discharging water from said conduit (2050) if water pressure in said conduit (2050) exceeds a preset set point; and, a second pressure relief valve (720) in fluid communication with conduit (2055), configured to release pressure by discharging water from said conduit (2055) if water pressure in said conduit (2055) exceeds a preset set point.

It is a further object of this invention to disclose a smart boiler system as defined in any of the above, comprising: a first temperature switch (530) in thermal contact with said first chamber (410); and, a second temperature switch (540) in thermal contact with said second chamber.

It is a further object of this invention to disclose a smart boiler system as defined in any of the above, comprising at least one indicator configured to inform a user that water within at least one of said first chamber and said second chamber is at a predetermined temperature.

It is a further object of this invention to disclose a smart boiler system as defined in any of the above, comprising: a first flow switch (801), configured to determine whether water is flowing through conduit (2070); a second flow switch (802), configured to determine whether water is flowing through conduit (2075); and, a third flow switch (803), configured to determine whether there is a flow of water exiting said outlet valve (305).

It is a further object of this invention to disclose a smart boiler system as defined in any of the above, wherein said control means comprises a user interface. In some preferred embodiments of the invention, wherein said user interface comprises at least one of the following: (a) a display of a volume of water in at least one of said two chambers (410, 420); (b) a display of a temperature set point; (c) an option of setting a desired temperature set point; (d) display of the current temperature of the water in each of said chambers; and, (e) memory for individualized menus that are configured to permit individual users to input and store system operating parameters.

It is a further object of this invention to disclose a smart boiler system as defined in any of the above, wherein said control means is programmed according to a home internet protocol that provides a data connection between said water heating system and at least one appliance.

It is a further object of this invention to disclose a smart boiler system as defined in any of the above, wherein said control means is configured to place said system in a STANDBY mode in which said heaters are turned off and all other system components remain in their most recent state. In some preferred embodiments of the invention, said control means is configured to place said system in said STANDBY mode automatically if a predetermined condition or set of conditions is met. In some preferred embodiments of the invention, said predetermined condition is selected from the group consisting of: (a) a predetermined amount of time passing without said fill mode switching; and, (b) neither heater is activated for more than a predetermined time within a predetermined time period.

It is a further object of this invention to disclose a smart boiler system as defined in any of the above, wherein said control means is configured to allow said system to be switched to manual control.

It is a further object of this invention to disclose a smart boiler system as defined in any of the above, comprising electricity measurement means configured to perform at least one task selected from the group consisting of: (a) measuring system electricity use over a predetermined period; (b) measuring system electricity use since a measurement reset was performed; (c) estimating electricity costs associated with electricity used by said system; (d) presenting results of measurements of electricity use on a user interface; and, (e) presenting estimates of electricity costs associated with electricity used by said system.

It is a further object of this invention to disclose a smart boiler system as defined in any of the above, wherein said control means comprises a system clock configured to measure and store a length of time that each of said pumps and each of said heaters is in use. In some preferred embodiments of the invention, at least one of the following is true: (a) said system clock is configured to be independently resettable for each of said pumps and each of said heaters; and, (b) said system clock is configured to be resettable only upon input of a code.

It is a further object of this invention to disclose a smart boiler system as defined in any of the above, wherein said first heater (451) and said second heater (452) are located remotely from said boiler (400), and said smart boiler system comprises: a first heater conduit (4518) in fluid connection with said first chamber inlet (4510) and said first chamber (410); and, a second heater conduit (4528) in fluid connection with said second chamber inlet (4520) and said second chamber (420).

It is a further object of this invention to disclose a smart boiler system as defined in any of the above, wherein said system is characterized by a default state in which said heaters and said pumps are off; first and second valves (301) and (302) are open; third valve (303) is closed; inlet valve (304) is configured to create a fluid connection between its inlet and inlet (4520) of said second chamber; and, outlet valve (305) is configured to create a fluid connection between its outlet and said outlet (4150) of said first chamber.

It is a further object of this invention to disclose a smart boiler system as defined in any of the above, wherein said system is configured such that first heater (451) cannot operate if said first pump (101) is not operating and said second heater (452) cannot operate if said second pump (102) is not operating.

It is a further object of this invention to disclose a smart boiler system as defined in any of the above, wherein said system is configured such that only one of said two heaters can operate at any given time. In some preferred embodiments of the invention, if water in both of said two chambers is characterized by a temperature of at least a predetermined amount below a predetermined temperature: if said second valve (302) is open and said first valve (301) is closed, said second heater (452) is activated and said first heater (451) is shut off; and, if said first valve (301) is open and said second valve (302) is closed, said first heater (451) is activated and said second heater (452) is shut off. In some particularly preferred embodiments of the invention, said predetermined amount is 0.5° C.

It is a further object of this invention to disclose a smart boiler system as defined in any of the above, wherein said control means is configured to determine an efficiency of each of said heaters (451) and (452).

It is a further object of this invention to disclose a smart boiler system as defined in any of the above, wherein said control means is configured to whether each of said heaters (451) and (452) is operating normally.

It is a further object of this invention to disclose a smart boiler system as defined in any of the above, wherein said control means is configured: if said second valve (302) is open and said first valve (301) is closed, to determine whether said second pump (102) and said second flow switch (802) are operating properly; and, if said first valve (301) is open and said second valve (302) is closed, to determine whether said first pump (101) and said first flow switch (801) are operating properly.

It is a further object of this invention to disclose a smart boiler system as defined in any of the above, wherein said control means is configured to determine a volume of water in each of said chambers.

It is a further object of this invention to disclose a smart boiler system as defined in any of the above, wherein said control means is configured to calculate the time necessary to raise a temperature of water in a predetermined one of said chambers by a predetermined temperature. In some preferred embodiments of the invention, said predetermined temperature is 0.5° C.

It is a further object of this invention to disclose a smart boiler system as defined in any of the above, wherein said control means is configured to measure at least one of: flow rate through said recirculating pumps; and, pumping speed of said recirculating pumps.

It is a further object of this invention to disclose a smart boiler system as defined in any of the above, wherein said control means is configured to alert a user that a volume of heated water in said boiler has reached a predetermined minimum value for a first time after said system has been initialized or after said system has passed through a system status of STANDBY.

It is a further object of this invention to disclose a smart boiler system as defined in any of the above, wherein said first non-return valve (730) and said second non-return valve (740) are configured to open when pressure at said inlet exceeds pressure at said outlet by at least 0.5 bar.

It is a further object of this invention to disclose a smart boiler system as defined in any of the above, wherein at least one of said first chamber (410), said second chamber (420), said flexible barrier (430), said first grid (460), and said second grid (465) is constructed of a material that can withstand a pressure of 2 atmospheres without being permanently damaged.

It is a further object of this invention to disclose a smart boiler system as defined in any of the above, wherein at least one of said first chamber (410), said second chamber (420), said flexible barrier (430), said first grid (460), and said second grid (465) is constructed of a material that can withstand repeated cycles of pressurization to 2 atmospheres and depressurization to atmospheric pressure without being permanently damaged.

It is a further object of this invention to disclose a water heating system, wherein said water heating system comprises:
- a heat exchange subsystem, comprising: a heat exchange apparatus (1000) comprising (a) a cold side (1010) comprising a cold side inlet (1030) and a cold side outlet (1040); and, (b) a hot side (1020) comprising a hot side inlet (1050) and a hot side outlet (1060);
- a supplementary heating subsystem comprising a smart boiler system as defined in any of the above;
- a conduit (2040) providing a fluid connection between said outlet of said cold side of said heat exchange apparatus (1040) and said inlet of said three-way inlet valve (304); and,
- a system control subsystem configured to control flow of water through said water heating system.

It is a further object of this invention to disclose such a water heating system, additionally comprising: (a) a third pump (103) configured to pump water from said drain (3010) to said inlet (1050) of said hot side of said heat exchanger; (b) a backpressure relief regulator (205) disposed between said third pump (103) and said hot side inlet (1050); (c) a first level valve (210) in fluid connection with said drain conduit (2010) and in communication with a pump control system of said third pump, said first level valve configured such that when a water level is equal to or above a predetermined level, said first level valve sends a signal to said pump control system of third pump to start operation; and, (d) a second level valve (215) in fluid connection with said drain conduit (2010) and in communication with said pump control system of said third pump, said second level valve configured such that when a water level falls below a predetermined level, said second level valve sends a signal to said pump control system of third pump to cease operation.

It is a further object of this invention to a water heating system as defined in any of the above, wherein: said smart boiler system comprises a third flow switch (803), configured to determine whether there is a flow of water exiting said outlet valve (305); said third flow switch is in communication with said pump control system of said third pump and configured to send a signal to said third pump if said flow of water exiting said outlet valve exceeds a predetermined minimum value; and, said pump control system is configured such that if said third pump has been in operation for more than a predetermined minimum time and no signal is received from said third flow switch, said pump control system shuts down operation of said third pump independently of whether a signal has been received from said second level valve.

It is a further object of this invention to a water heating system as defined in any of the above, wherein said hot side inlet (1050) is in fluid connection with a source of warm wastewater. In some preferred embodiments of the invention, said source of warm wastewater is selected from the group consisting of a drain of a shower, a drain of a bath, and a drain of a sink.

It is a further object of this invention to a water heating system as defined in any of the above, comprising a first filter (201) upstream of said inlet (1030) to said cold side of said heat exchanger and a second filter (202) upstream of said inlet (1050) of said hot side of said heat exchanger.

It is a further object of this invention to a water heating system as defined in any of the above, comprising a bypass conduit (2005) providing a fluid connection between a point downstream of said third pump and a point in said drain conduit (2010) upstream of said third pump; and, a float valve (500) disposed such that water flowing through said bypass conduit will flow through said float valve.

It is a further object of this invention to a water heating system as defined in any of the above, wherein at least one of said system control subsystem and said control means is configured to allow said system to be switched to manual control.

It is a further object of this invention to a water heating system as defined in any of the above, comprising electricity measurement means configured to perform at least one task selected from the group consisting of: (a) measuring system electricity use over a predetermined period; (b) measuring system electricity use since a measurement reset was performed; (c) estimating electricity costs associated with electricity used by said system; (d) presenting results of measurements of electricity use on a user interface; and, (e) presenting estimates of electricity costs associated with electricity used by said system.

It is a further object of this invention to a water heating system as defined in any of the above, wherein at least one of said system control subsystem and said control means is configured to determine an efficiency of each of said heaters (451) and (452).

It is a further object of this invention to a water heating system as defined in any of the above, wherein at least one of said system control subsystem and said control means is configured to whether each of said heaters (451) and (452) is operating normally.

It is a further object of this invention to a water heating system as defined in any of the above, wherein at least one of said system control subsystem and said control means is configured to perform a determination selected from the group consisting of: (a) a determination of whether said second pump (102) and said second flow switch (802) are operating properly; and, (b) a determination of whether said first pump (101) and said first flow switch (801) are operating properly.

It is a further object of this invention to a water heating system as defined in any of the above, wherein at least one of said system control subsystem and said control means is configured to determine a temperature of water in each of said chambers and a volume of water in each of said chambers.

It is a further object of this invention to a water heating system as defined in any of the above, wherein: at least one of said system control subsystem and said control means is configured to calculate a time necessary to raise a temperature of water in a predetermined one of said chambers by a predetermined temperature; and, at least one of said system control subsystem and said control means comprises calculating means programmed to calculate a volume of water within said chamber from the amount of time needed to raise said temperature by said predetermined temperature rise.

It is a further object of this invention to a water heating system as defined in any of the above, wherein at least one of said system control subsystem and said control means is configured to measure at least one of: flow rate through said recirculating pumps; and, pumping speed of said recirculating pumps.

It is a further object of this invention to a water heating system as defined in any of the above, wherein said first non-return valve (730) and said second non-return valve (740) are configured to open when pressure at said inlet exceeds pressure at said outlet by at least 0.5 bar.

It is a further object of this invention to a water heating system as defined in any of the above, wherein at least one of said first chamber (410), said second chamber (420), said flexible barrier (430), said first grid (460), and said second grid (465) is constructed of a material that can withstand a pressure of 2 atmospheres without being permanently damaged.

It is a further object of this invention to a water heating system as defined in any of the above, wherein at least one of said first chamber (410), said second chamber (420), said flexible barrier (430), said first grid (460), and said second grid (465) is constructed of a material that can withstand repeated cycles of pressurization to 2 atmospheres and depressurization to atmospheric pressure without being permanently damaged.

It is a further object of this invention to disclose a hot water delivery system for providing hot water to a water delivery outlet (3000) at a point of use, wherein said hot water delivery system comprises: a drain (3010); a water heating system as defined in any of the above; a drain conduit (2010) providing a fluid connection between said drain (3010) and said inlet (1050) to said hot side of said heat exchanger (1000); a system drain (3020); a conduit (2020) providing a fluid connection between said outlet (1060) of said hot side of said heat exchanger and said system drain; a fluid connection between said inlet (1030) of said cold side of said heat exchanger and a source of mains water (2030A); a first mains valve (300) between said source of mains water and said inlet of said cold side of said heat exchanger; mixing means for mixing water flowing out of said outlet valve (305) with incoming water from a source of mains water (2030B); and, a conduit (2095) configured to conduct water from said mixing means to said water delivery means.

It is a further object of this invention to disclose such a hot water delivery system, wherein said mixing means comprises: a cold water valve (306) downstream of said source of mains water (2030B); a hot water valve (307) in fluid connection with said outlet of said three-way outlet valve (305) via conduit (2090); and, means for providing fluid connections from said cold water valve (306) and said hot water valve (307) to said conduit (2095) via at least one common point.

It is a further object of this invention to disclose a hot water delivery system as defined in any of the above, comprising a third pump (103) configured to pump water from said drain (3010) to said inlet (1050) of said hot side of said heat exchanger; a float valve (500); and a bypass conduit (2005) providing a fluid connection between a point downstream of said third pump and a point in said drain conduit (2010) upstream of said third pump via said float valve.

It is a further object of this invention to disclose a hot water delivery system as defined in any of the above, wherein said hot water delivery outlet (3000) is a shower head.

It is a further object of this invention to disclose a hot water delivery system as defined in any of the above, wherein said hot water delivery outlet (3000) is a sink faucet.

It is a further object of this invention to disclose a method for providing hot water to a point of use, said point of use comprising a water delivery outlet (3000) and a drain (3010), wherein said method comprises:
  obtaining a water heating system as defined in any of the above;
  defining a system state "FIRST CHAMBER FILL" as the system state set following production of a signal by said volume detecting means indicating that said flexible barrier is within a predetermined distance of an interior surface of said first chamber;
  defining a system state "SECOND CHAMBER FILL" as the system state set following production of a signal by said volume detecting means indicating that said flexible barrier is within a predetermined distance of an interior surface of said second chamber;
  defining a system state "STANDBY MODE" as a system state in which said heaters and pumps are turned off and all other system components remain in their most recent state;
  providing fluid connections between: (a) said drain and said inlet (1050) of said hot side of said heat exchanger; (b) said outlet (1060) of said hot side of said heat exchanger and a system drain (3020); (c) said inlet (1030) of said cold side of said heat exchanger and a source of mains water (2030A); (d) said water delivery outlet and said outlet of said three-way outlet valve (305) via conduit (2095); and, (e) said water delivery outlet and a source of mains water (2030B);
  initializing said system by:
    opening said first valve (301) and said third valve (303);
    pumping water from said second chamber (420) to said first chamber (410) until a signal is obtained from said volume detecting means indicating that said flexible barrier is within said predetermined distance of said interior surface of said second chamber, thereby setting said system state to SECOND CHAMBER FILL;
    closing said third valve;
    activating said first heater (451); and,
    recirculating water from said first chamber (410) via said first chamber outlet (4100), conduit (2070), and said first chamber inlet (4515) until water in said first chamber has reached a predetermined temperature;
  simultaneously flowing warm waste water from said drain (3010) through said hot side of said heat exchanger and cold mains water from said source of mains water (2030A) through said cold side of said heat exchanger thereby transferring heat from said warm waste water to said cold mains water and producing warm mains water;
  flowing said warm mains water via conduit (2040) via said three-way inlet valve (304);
  if said system state is FIRST CHAMBER FILL:
    setting said three-way inlet valve (304) to provide a fluid connection between conduit (2040) and conduit (2050);
    setting said three-way outlet valve (305) to provide a fluid connection between said second chamber (420) and said outlet of said three-way outlet valve;
    activating said first heater (451);
    opening said first valve (301);
    opening said second valve (302);
    activating said first recirculating pump (101), thereby recirculating water from said first chamber through said conduit (2070) and heating said water flowing into said first chamber and/or said water being recirculated through said first chamber and said conduit (2070); and,
    activating said second recirculating pump (102);
  if said system state is SECOND CHAMBER FILL:
    setting said three-way inlet valve (304) to provide a fluid connection between conduit (2040) and conduit (2055);
    setting said three-way outlet valve (305) to provide a fluid connection between said first chamber (410) and said outlet of said three-way outlet valve;
    activating said second heater (452);
    opening said second valve (302);
    opening said first valve (301);
    activating said second recirculating pump (102), thereby recirculating water from said second chamber through said conduit (2075) and heating said water flowing into said second chamber and/or said water being recirculated through said second chamber and said conduit (2075); and,
    activating said first recirculating pump (101);
  flowing water from said smart boiler to said outlet of said three-way outlet valve;
  mixing said water flowing from said outlet of said three-way outlet valve with cold water from a mains water source (2030B) as needed to cool said water from said smart boiler to a desired final temperature; and,
  flowing water from said three-way outlet valve via conduit (2095) to said water delivery outlet (3000).

It is a further object of this invention to disclose such a method, comprising:
  if said system status is FIRST CHAMBER FILL:
    measuring a temperature in said first chamber;
    providing a BOILER READY alert when said temperature reaches a predetermined value for a first time after either said step of initializing or after said system has passed through STANDBY MODE;
    deactivating said first heater when said temperature reaches said predetermined value; and,
    activating said first heater when said temperature is below a predetermined minimum value;
  if said system status is SECOND CHAMBER FILL:
    measuring a temperature in said second chamber (420);
    providing a BOILER READY alert when said temperature reaches a predetermined value for a first time after either said step of initializing or after said system has passed through STANDBY MODE;
    deactivating said second heater when said temperature reaches said predetermined value; and,
    activating said second heater when said temperature is below a predetermined minimum value.

It is a further object of this invention to disclose the method as defined in any of the above, wherein said step of activating said first heater (451) is followed by steps of: (a) measuring a temperature in said first chamber (410), (b) deactivating said first heater when said temperature reaches a predetermined value, and (c) activating said first heater when said temperature is below a predetermined minimum value; and said step of activating said second heater (452) is followed by steps of: (a) measuring a temperature in said second chamber (420); (b) deactivating said first heater when said temperature reaches said predetermined value;

and (c) activating said first heater when said temperature is below a predetermined minimum value.

It is a further object of this invention to disclose the method as defined in any of the above, wherein said hot water delivery outlet (3000) is selected from the group consisting of: a shower head and a sink faucet.

It is a further object of this invention to disclose the method as defined in any of the above, wherein said step of mixing said water flowing from said outlet of said three-way outlet valve with cold water from a mains water source comprises: flowing said water from said outlet of said three-way outlet valve (305) via conduit (2090) to a hot water valve (307) comprising an outlet in fluid communication with conduit (2095); flowing water from said mains water source to a cold water valve (306) comprising an outlet in fluid communication with conduit (2095); and, opening said hot water valve and said cold water valve as needed to bring water exiting said hot water delivery outlet to a desired temperature.

It is a further object of this invention to disclose the method as defined in any of the above, comprising informing a user that water within at least one of said first chamber and said second chamber is at a predetermined temperature. In some preferred embodiments of the method, said step of informing a user that water within at least one of said first chamber and said second chamber is at a predetermined temperature comprises lighting an indicator when water within at least one of said first chamber and said second chamber is at a predetermined temperature.

It is a further object of this invention to disclose the method as defined in any of the above, comprising at least one of the following: (a) displaying on a user interface a volume of water in at least one of said chambers (410, 420); (b) displaying on a user interface a temperature set point; (c) providing an option on a user interface of setting a desired temperature set point; and, (d) displaying on a user interface the current temperature of the water in each of said chambers.

It is a further object of this invention to disclose the method as defined in any of the above, comprising: providing memory to a user interface for individualized menus; and, configuring said menus to permit individual users to input and store system operating parameters.

It is a further object of this invention to disclose the method as defined in any of the above, comprising programming at least one of said system control subsystem and said control means according to a home internet protocol that provides a data connection between said water heating system and at least one appliance.

It is a further object of this invention to disclose the method as defined in any of the above, comprising placing said system in a STANDBY mode in which said heaters are turned off and all other system components remain in their most recent state. In some preferred embodiments of the invention, it comprises placing said system in said STANDBY mode automatically if a predetermined condition or set of conditions is met. In some particularly preferred embodiments of the invention, said predetermined condition is selected from the group consisting of: a predetermined amount of time passing without said fill mode switching; and neither heater is activated for more than a predetermined time within a predetermined time period.

It is a further object of this invention to disclose the method as defined in any of the above, comprising determining an efficiency of one of said heaters during a time when water is not being drawn from said smart boiler system, said step of determining an efficiency of said heaters comprising: selecting a particular heater to be tested; transferring water to the chamber with which said heater is thermal contact until said chamber is filled to its maximum volume; activating said recirculating pump that is in fluid connection with said chamber when said third valve (303) is closed and said first or said second valve (301, 302) downstream of said recirculating pump is open; activating said heater for a predetermined heating time; measuring a rise in temperature of water in said chamber; calculating the expected rise in temperature from said maximum volume, said predetermined heating time, and energy supplied to said heater; and, comparing said rise in temperature with said expected rise in temperature, thereby obtaining an efficiency of said heater. In some preferred embodiments of the method, it comprises automatically updating system control software according to results of said step of determining an efficiency of said heaters. In some preferred embodiments of the method, it comprises providing a warning to a user if said efficiency is below a predetermined level.

It is a further object of this invention to disclose the method as defined in any of the above, comprising: determining whether said heaters are operating normally, said step of determining whether said heaters are operating normally comprising: filling a predetermined chamber; activating for a predetermined test time said heater in thermal contact with said chamber and said recirculating pump that is in fluid connection with said chamber when said third valve (303) is closed and said first or said second valve (301, 302) downstream of said recirculating pump is open; measuring a temperature rise of water in said chamber during said predetermined test time; comparing said temperature rise with an expected temperature rise calculated from a volume of water in said chamber, the predetermined test time, and the energy supplied to said heater; and, if said temperature rise is less than said expected temperature rise, providing an alert that said heater is not operating normally.

It is a further object of this invention to disclose the method as defined in any of the above, comprising:
automatically determining whether a recirculating pump in fluid connection with a predetermined chamber and a flow switch downstream of said recirculating pump are operating normally, said step of automatically determining whether said recirculating pump and flow switch are operating normally comprising: recirculating water through said chamber for a predetermined pre-test period; if a signal is received from said flowmeter, determining that said recirculating pump is operating normally; and, if no signal is received from said flowmeter downstream of said recirculating pump: determining that said recirculating pump is not operating normally;
blocking activation of a heater in thermal contact with said chamber; and,
providing an alert that said recirculating pump is not operating normally.

It is a further object of this invention to disclose the method as defined in any of the above, comprising determining whether said first and second recirculating pumps (101, 102), said first and second proximity sensors (441, 442), and said first and second flow switches (801, 802) are operating normally, said step of determining whether said first and second recirculating pumps, said first and second proximity sensors, and said first and second flow switches are operating normally comprising:
performing procedure (a), said procedure (a) comprising:
activating said first recirculating pump (101);
closing said first valve (301);

opening said second valve (302) and said third valve (303);
waiting a predetermined emptying time;
if a signal is received from said second flow switch (802) after said steps of activating first recirculating pump and opening said second valve, and a signal is received from said first proximity sensor (441) prior to the conclusion of said predetermined emptying time: providing a notification that said first recirculating pump (101), said second flow switch (802), and said first proximity sensor (441) are in proper working condition;
if no signal is received from said second flow switch (802) after said steps of activating first recirculating pump and opening said second valve, but a signal is received from said first proximity sensor (441) prior to the conclusion of said predetermined emptying time: providing a notification that said first recirculating pump (101) and said first proximity sensor (441) are in proper working condition, but that there is a fault in said second flow switch (802);
if a signal is received from said second flow switch (802) after said steps of activating first recirculating pump and opening said second valve, but no signal is received from said first proximity sensor (441) prior to the conclusion of said predetermined emptying time: providing a notification that said first recirculating pump (101) and said second flow switch (802) are in proper working condition, but that there is a fault in said first proximity sensor (441);
if no signal is received from either said second flow switch (802) or said first proximity sensor (441) prior to the conclusion of said predetermined emptying time: providing a notification that there is a fault either in said first recirculating pump (101) or in said second valve (302); and,
performing procedure (b), said procedure (b) comprising:
activating said second recirculating pump (102);
closing said second valve (302);
opening said first valve (301) and said third valve (303);
waiting a predetermined emptying time;
if a signal is received from said first flow switch (801) after said steps of activating second recirculating pump and opening said first valve, and a signal is received from said second proximity sensor (442) prior to the conclusion of said predetermined emptying time: providing a notification that said second recirculating pump (102), said first flow switch (801), and said second proximity sensor (442) are in proper working condition;
if no signal is received from said first flow switch (801) after said steps of activating first recirculating pump and opening said second valve, but a signal is received from said second proximity sensor (442) prior to the conclusion of said predetermined emptying time: providing a notification that said second recirculating pump (102) and said second proximity sensor (442) are in proper working condition, but that there is a fault in said first flow switch (801);
if a signal is received from said first flow switch (801) after said steps of activating first recirculating pump and opening said second valve, but no signal is received from said second proximity sensor (442) prior to the conclusion of said predetermined emptying time: providing a notification that second recirculating pump (102) and said first flow switch (801) are in proper working condition, but that there is a fault in said second proximity sensor (442);
if no signal is received from either said first flow switch (801) or said second proximity sensor (442) prior to the conclusion of said predetermined emptying time: providing a notification that there is a fault either in said second recirculating pump (102) or in said first valve (301);
if, upon commencement of said diagnostics, a signal is received from said second proximity switch (442), indicating that said second chamber (420) is empty, or if upon commencement of said diagnostics, no signal is received from either said first proximity switch (441) or from said second proximity switch (442), indicating that said first (410) chamber is not empty, performing procedure (a) prior to performing procedure (b);
if, upon commencement of said diagnostics, a signal is received from said first proximity switch (441), indicating that said first chamber (410) is empty, performing said step of performing procedure (b) prior to said step of performing procedure (a).

It is a further object of this invention to disclose the method as defined in any of the above, comprising determining a volume of water contained within each of said chambers, said step of determining said volume comprising:
placing said system in STANDBY mode;
opening first valve (301) and second valve (302);
activating said first recirculating pump (101) and said second recirculating pump (102);
activating said first heater (451);
measuring the time needed to raise a temperature of water within said first chamber (410) by a predetermined amount;
calculating the volume of water in said first chamber (410) from said time and amount of heat delivered to said water;
activating said second heater (452);
measuring the time needed to raise a temperature of water within said second chamber (420) by a predetermined amount; and,
calculating the volume of water in said second chamber from said time and amount of heat delivered to said water.

It is a further object of this invention to disclose the method as defined in any of the above, comprising measuring at least one of (a) a flow rate through a recirculating pump and (b) a pumping speed of a recirculating pump, comprising:
filling one chamber to its maximum volume with water, thereby emptying a second chamber;
activating a recirculating pump configured to recirculate water through said filled chamber;
closing said valve (301 or 302) downstream of said recirculating pump;
opening said third valve (303);
measuring a time needed to transfer all of the water contained in said full chamber to said empty chamber; and,
calculating a flow rate through and/or a pumping speed of said pump from said time and said volume.

It is a further object of this invention to disclose the method as defined in any of the above, comprising preparing a predetermined amount of water for use at a predetermined temperature, comprising:
setting a desired final temperature;
setting a desired amount of water to be prepared;

selecting a chamber from which water is to be drawn;
determining amount of water in said chamber;
calculating how much water must be added to or drained from said chamber in order that said chamber will contain said desired amount of water;
calculating a time necessary to transfer water to said chamber;
activating a recirculation pump as necessary to drain water from or add water to said chamber;
opening said third valve (303) for said time;
repeating the five previous steps as needed until less than a predetermined amount of water needs to be transferred to bring said amount of water in said chamber to said desired amount;
activating a recirculating pump to recirculate water through said chamber; and,
activating a heater in thermal contact with said chamber until said water in said chamber reaches said desired temperature.

In some preferred embodiments of the method, said step of selecting a chamber comprises selecting a chamber that is not currently being filled.

In some preferred embodiments of the method, it comprises providing an alert to a user when at least one condition selected from the group consisting of: (a) said water has reached said predetermined temperature; and (b) an amount of heated water in said smart boiler has reached a minimum value; has been met. In some preferred embodiments of the method, it comprises: setting a predetermined minimum volume of heated water in said chamber; measuring a rate of flow of water exiting said outlet valve; alerting a user when a flow rate exceeds a predetermined flow rate; calculating an amount of time necessary to supply one liter of heated water to a point of use downstream of said system; calculating an amount of heated water remaining in said chamber from said amount of water prepared and a time during which said heated water has been supplied; and, estimating an amount of time until said heated water runs out; and, alerting said user, at the end of said estimated amount of time, that an amount of heated water in said smart boiler has reached said minimum volume.

In some preferred embodiments of the method, it comprises: waiting for a cessation in supply of said heated water; activating a heater in thermal contact with a second chamber from which water is not being drawn, said second chamber containing a volume of water; activating said recirculating pump in fluid connection with said chamber from which water is not being drawn for a predetermined time; determining the volume of water in said second chamber; calculating an amount of heated water from a difference between a volume of said smart boiler (400) and said volume of water in said second chamber; and, if said amount of heated water is below a predetermined minimum, alerting said user.

It is a further object of this invention to disclose the method as defined in any of the above, comprising providing a user with an option to allow said system to be switched to manual control.

It is a further object of this invention to disclose the method as defined in any of the above, comprising performing at least one task selected from the group consisting of: measuring system electricity use over a predetermined period; measuring system electricity use since a measurement reset was performed; estimating electricity costs associated with electricity used by said system; presenting results of measurements of electricity use on a user interface; and, presenting estimates of electricity costs associated with electricity used by said system.

It is a further object of this invention to disclose the method as defined in any of the above, comprising using a system clock configured to measure and store a length of time that each of said pumps and each of said heaters is in use.

It is a further object of this invention to disclose the method as defined in any of the above, comprising resetting said system, following a system shutdown and restart, to a default state in which said heaters and said pumps are off; first and second valves (301) and (302) are open; third valve (303) is closed; inlet valve (304) is configured to create a fluid connection between its inlet and inlet (4520) of said second chamber; and, outlet valve (305) is configured to create a fluid connection between its outlet and outlet (4150) of said first chamber.

It is a further object of this invention to disclose the method as defined in any of the above, wherein if water in both of said two chambers is characterized by a temperature of at least a predetermined amount below a predetermined temperature: if said second valve (302) is open and said first valve (301) is closed, activating said second heater (452) and shutting off said first heater (451); and, if said first valve (301) is open and said second valve (302) is closed, activating said first heater (451) and shutting off said second heater (452)

It is a further object of this invention to disclose the method as defined in any of the above, comprising at least one step selected from the group consisting of: determining whether said second pump (102) and said second flow switch (802) are operating properly; and, determining whether said first pump (101) and said first flow switch (801) are operating properly.

BRIEF DESCRIPTION OF THE DRAWINGS

The invention will now be described with reference to the drawings, wherein.

DETAILED DESCRIPTION OF THE PREFERRED EMBODIMENTS

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof.

As used herein, with reference to numerical quantities, the term "about" refers to a tolerance of ±20% around the nominal quantity.

The water heating and delivery system disclosed herein comprises two subsystems: a heat exchange subsystem and a "smart boiler" subsystem. The heat exchange subsystem comprises a heat exchanger that transfers heat from a flow of warm water to a flow of colder water, and then passes the warm water to the "smart boiler" system, which provides means for heating water to a desired final temperature. The smart boiler comprises two chambers divided by a flexible divider; in preferred embodiments, the flexible divider is a diaphragm made of a suitable elastic material that will not degrade at typical system temperatures and that is certified for use with a domestic water heating system. The volume of the boiler used in a particular installation will depend on the specific intended use. Since the system disclosed here is generally intended for short-term point-of-use heating, in typical embodiments, the smart boiler has a total volume of about 40 liters, thereby permitting rapid heating but still capable of providing sufficient hot water for typical uses such as for a shower. Construction of a boiler or water heating system as described herein of any desired volume will be well within the abilities of one of ordinary skill in the art. Consequently, any description of a boiler of a particular volume is for purposes of illustration only, and is in no way limiting.

Figure 1A:
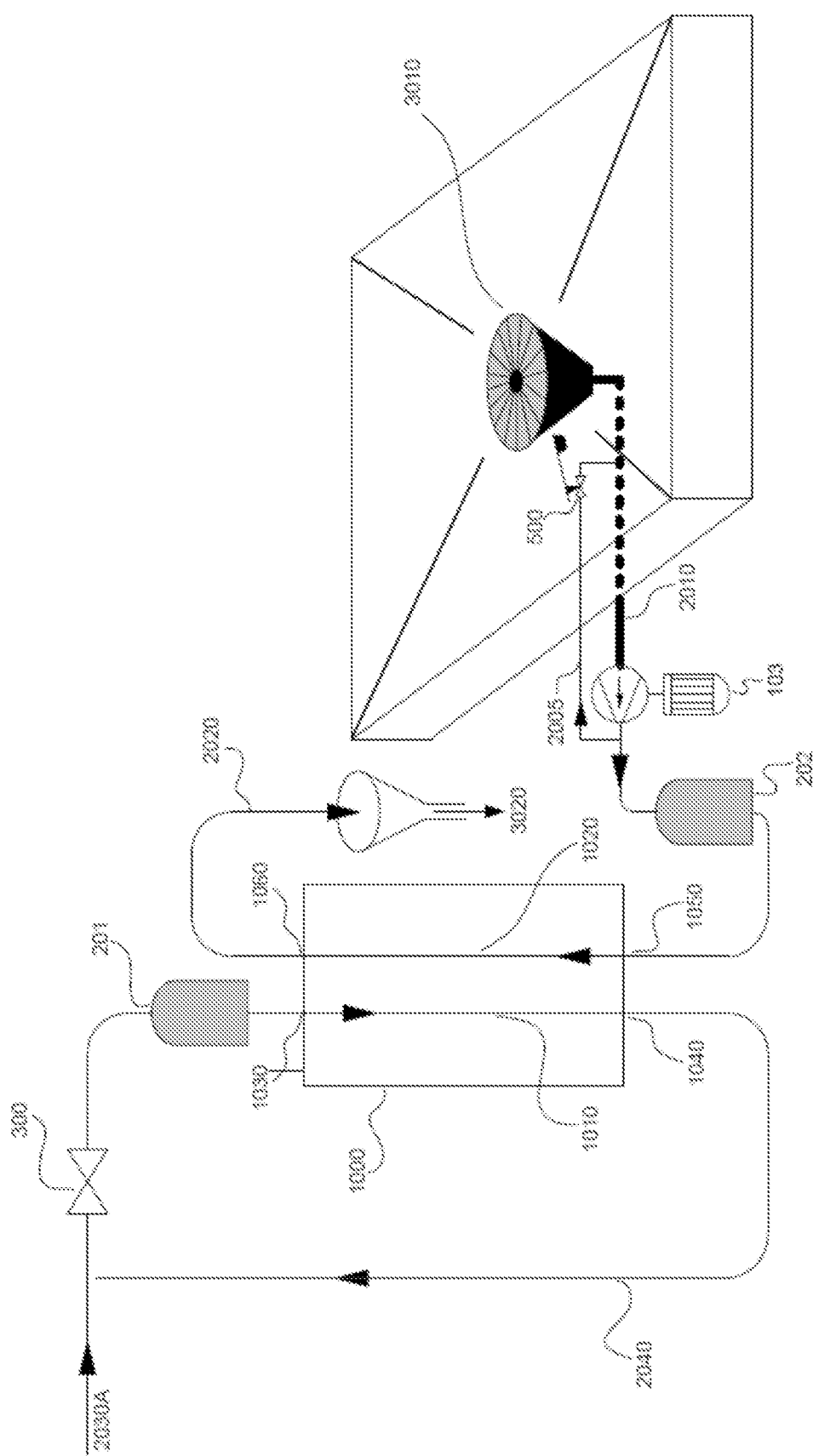
FIG. 1A presents a schematic diagram of one non-limiting embodiment of the heat exchange subsystem of the invention herein disclosed.

Reference is now made to FIG. 1A, which presents a schematic diagram of one non-limiting embodiment of the heat exchange subsystem. The system contains a heat exchanger 1000 configured to transfer from a flow of warm water entering, via inlet 1050, the hot side 1020 of the heat exchanger to a flow of cold water entering, via inlet 1030, the cold side 1010 of the heat exchanger, typically flowing in the opposite direction. In typical embodiments of the invention, outlet 1060 of the hot side of the heat exchanger is in fluid contact, via conduit 2020, with a system drain.

A source of cold mains water (2030A) is placed in fluid connection with inlet 1030 of the cold side of the heat exchanger, typically via a cutoff valve 300. In some embodiments of the invention, a filter 201 is placed upstream of inlet 1030.

In typical embodiments of the invention, inlet 1050 of the hot side of the heat exchanger is in fluid connection with a drain 3010 of a shower or sink, which acts as a source of warm water, via drain conduit 2010. The drain system typically has a slope sufficient that the water will flow naturally to the heat exchanger. In some embodiments, the warm water source is connected to the heat exchanger via pump 103. In these embodiments, in order to prevent air from entering the pump, the system comprises a float valve 500 located in a bypass conduit 2005 that connects a point downstream of the third pump with a point in drain conduit 2010 between the drain and the third pump. In some preferred embodiments, a filter 202 is placed upstream of inlet 1050 in order to prevent dirt, suspended minerals, etc., from entering the heat exchanger.

After passing through the heat exchanger, the water on the warm side of the heat exchanger (e.g. the water that entered from drain 3010 via inlet 1050) is drained from the system by exiting the heat exchanger via outlet 1060 to system drain 3020 via conduit 2020. Warmed mains water is then directed to its point of use via conduit 2040, which is connected to outlet 1040 of the cold side of the heat exchanger. Conduit 2040 then carries the warmed water to its point of use. In preferred embodiments of the invention, the system comprises a smart boiler subsystem, described in detail below, and conduit 2040 carries the warmed water to the smart boiler subsystem, from which it is delivered to its point of use after additional heating if such heating is necessary.

Figure 1B:
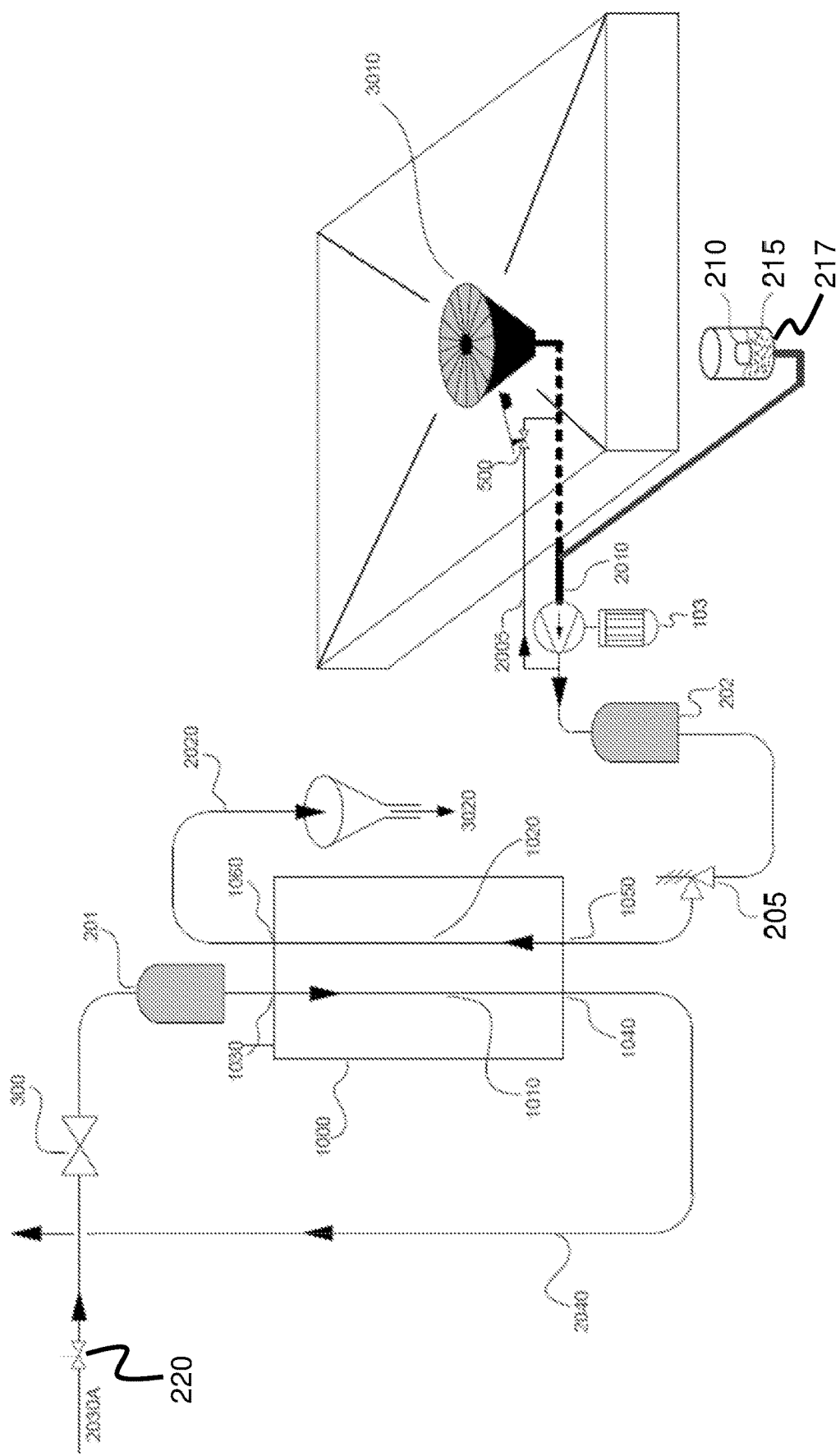
FIG. 1B presents a schematic diagram of a second non-limiting embodiment of the heat exchange subsystem of the invention herein disclosed.

Reference is now made to FIG. 1B, which presents a schematic diagram of a second non-limiting embodiment of the heat exchange subsystem. In the embodiment depicted in FIG. 1B, in addition to the components present in the embodiment depicted schematically in FIG. 1A, the heat exchange subsystem includes a backpressure relief regulator (205) and level switches (210, 215).

In the embodiment illustrated in FIG. 1B, the backpressure relief regulator 205 is in fluid connection with the conduit that conveys water from drain 3010 to inlet 1050 downstream of pump 103. The backpressure relief regulator is configured to cause the forepressure or the backpressure of pump 103 to rise as needed in order to regulate the pressure difference to a value appropriate to float valve 500 so that the float valve can operate properly; the float valve operates optimally when the pressure difference between its inlet and outlet is minimal.

The embodiment illustrated schematically in FIG. 1B also incorporates an upper level switch 210 and a lower level switch 215 in fluid connection with drain conduit 2010 and in communication with the control system of pump 103. In preferred embodiments of the invention, the level switches are enclosed in vessel 217 that typically has a volume of a few hundred ml. When the water level in vessel 217 reaches a predetermined level, upper level switch 210 is activated, thereby generating a signal that is transmitted to the control system of the pump, activating the pump. Conversely, when the water level in vessel 217 falls below a predetermined level, lower level switch 215 is activated, thereby generating a signal that is transmitted to the control system of the pump, causing the pump to cease its operation. Note that if the amount of water supplied by pump 103 exceeds the instantaneous needs of the system, bypass line 2005 is opened, and the water pumped by pump 103 is simply drained from the system.

In some preferred embodiments of the invention the upper level switch activates pump 103 for only a predetermined amount of time, typically about two minutes. In especially preferred embodiments of the invention in which the upper level switch activates pump 103 for only a predetermined amount of time, the pump control system for the pump is in communication with means for determining the water needs at the point of use (e.g. a flow meter, a flow switch, or a flow transmitter), or at the smart boiler when the heating subsystem is part of a system that includes the smart boiler subsystem described below. If it is determined that there is no additional need for water, then the pump ceases operation, regardless of the status of level switches 210 and 215. As a non-limiting example, if a flow switch is used, it will send a signal to pump 103 as long as the flow is above a predetermined minimum, which may be zero. The pump control system of the pump is configured such that the pump only operates when a signal is received from the flow switch; if the signal from the flow switch ceases, the pump ceases operation, whether or not it is receiving a signal from level switch 215.

In preferred embodiments of the invention, particularly but not exclusively those in which the heat exchange subsystem is used to supply water to the "smart boiler" described in detail below, the heat exchange subsystem includes a water pressure regulator (220) in the inlet line, preferably upstream of inlet valve 300. The pressure regulator acts to limit the maximum overpressure possible in the system, and also acts to prevent variations in the water pressure supplied to the system due to variations in the mains water pressure.

It is within the scope of the invention to disclose a "smart boiler." Since the smart boiler is a subsystem of the water heating system herein disclosed, in the description that follows, it is treated as a subsystem of the overall water heating and delivery system. The smart boiler disclosed here can, however, act as a standalone water heating system independent of the heat exchange subsystem described above. In such cases, rather than connecting the smart boiler to a heat exchange subsystem, the boiler can be used independently and be connected to any source of water. The case in which the smart boiler described in detail below is manufactured, used, or intended for use as a standalone water heating system rather than a subsystem of a more general water heating or supply system is considered by the inventor to be within the scope of the invention.

Figure 2A:
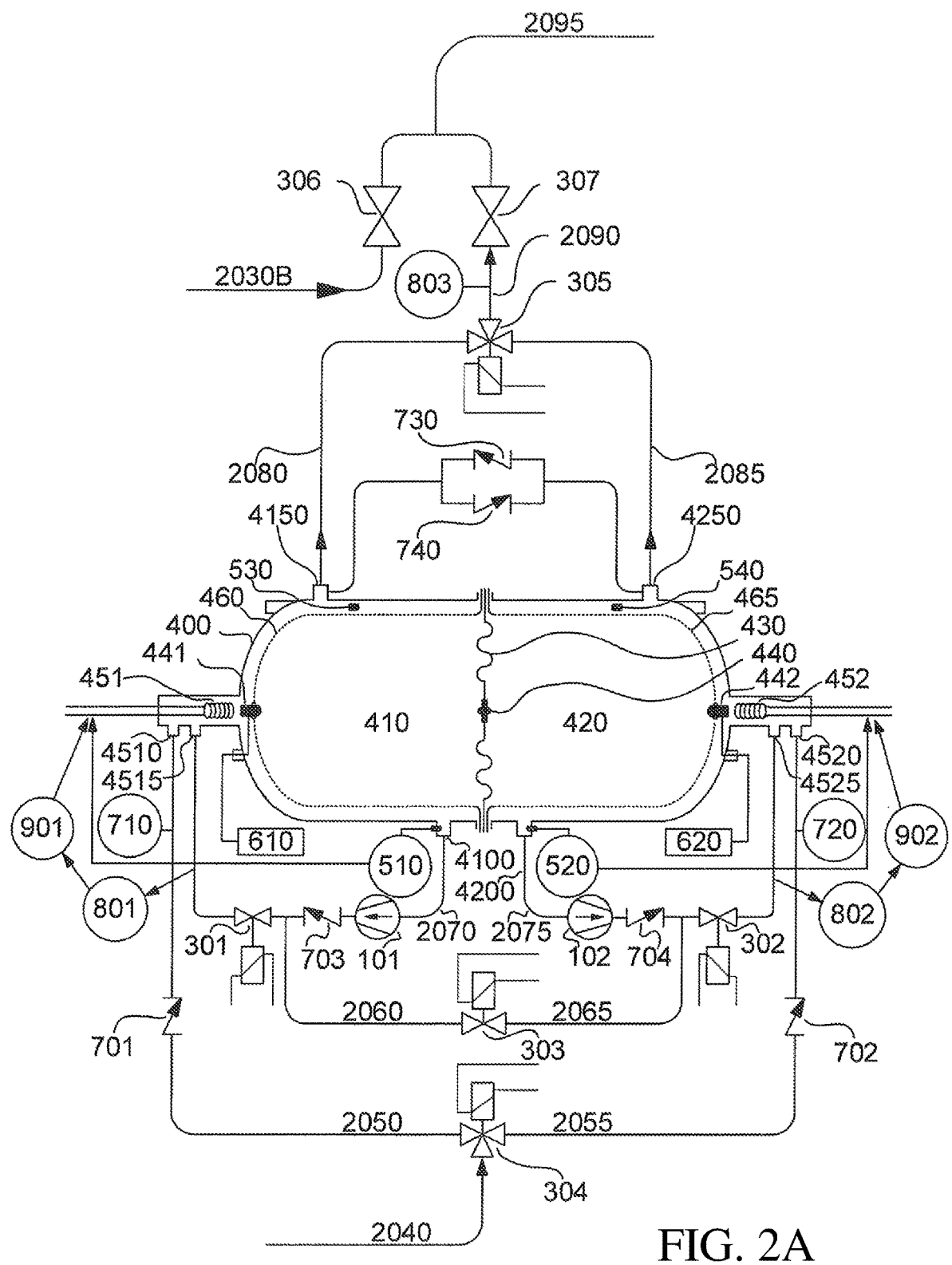
FIG. 2A presents a schematic diagram of one non-limiting embodiment of the "smart boiler" subsystem of the invention herein disclosed.

Reference is now made to FIG. 2A, which presents a schematic diagram of one non-limiting embodiment of the smart boiler subsystem. The smart boiler subsystem comprises a boiler 400, which is divided into two chambers, a first chamber 410 and a second chamber 420, by a flexible barrier 430. In preferred embodiments of the invention, the flexible barrier is a diaphragm and is placed at the center of the boiler so that it is minimally distorted when the two chambers contain equal volumes of water. In preferred embodiments, the flexible barrier is made of a material (non-limiting examples of appropriate materials include plastic, rubber, and silicone compounds) that is sufficiently flexible to be able to accommodate a situation in which one chamber is completely full or nearly so, and the other empty, i.e. the barrier approaches the interior wall of one chamber, assuming its shape and size. In preferred embodiments, the circumference of the barrier is fixed to the interior wall of the chamber at its center. In some embodiments, the barrier itself moves (e.g. it is enclosed in a frame on tracks within the boiler) in response to the relative amounts of water contained in the two chambers.

Each chamber comprises two inlets (4510 and 4515 for the first chamber; 4520 and 4525 for the second chamber) preferably disposed at the ends of the boiler, i.e., as far as possible from the flexible barrier. A heater is disposed at the inlet to each chamber (451 for the first chamber, 452 for the second chamber) such that water entering the chamber will come in thermal contact with the heater. Any heater known in the art suitable for use with a water boiler may be used. In typical embodiments of the invention, the heaters are rated at 3.0 kW each. Conduit 2040 is in fluid connection with inlets 4510 and 4520 via a three-way inlet valve 304 and conduits 2050 and 2055, respectively. The three-way valve is configured to direct a flow of water to one or the other of the chambers.

Each chamber further comprises two outlets (4100 and 4150 for the first chamber; 4200 and 4250 for the second chamber). Outlet 4100 is in fluid connection with inlet 4515 through conduit 2070 via a first recirculating pump 101 and a normally open first valve 301, while outlet 4200 is in fluid connection with inlet 4525 through conduit 2075 via a recirculating second pump 102 and normally open second valve 302. Thus, when the valve associated with a particular chamber is open, and the corresponding pump in operation, water will be recirculated in that chamber and heated as it passes the heater, thereby ensuring rapid and even heating of the water within that chamber. In preferred embodiments of the invention, the system includes first and second flow switches 801 and 802 that are in fluid communication with conduits 2070 and 2075, respectively. These switches provide a signal when the flow through the conduit is above a predetermined set point, thus providing an indication to the user that water is flowing through the conduit.

In preferred embodiments of the invention, each chamber has a grid (460, 465 for the first and second chambers respectively). The grids primarily serve to prevent the flexible barrier from blocking the chamber outlets.

In preferred embodiments of the invention, the chambers 410 and 420, flexible barrier 430, and grids 460 and 465 are constructed of materials that can withstand a pressure of 2 atmospheres without undergoing damage such as permanent deformation or bursting. In the most preferred embodiments of the invention, the chambers, diaphragm, and grid are constructed of materials that can withstand repeated cycles of pressurization to 2 atmospheres and depressurization to atmospheric pressure without undergoing damage such as permanent deformation or bursting.

Outlets 4150 and 4250 are connected to the inlets of three-way outlet valve 305, which provides the outlet for heated water to leave the heating system to its point of use. In preferred embodiments of the invention, outlet valve 305 is configured such that water can flow from either chamber to the outlet side of the valve, but not from both chambers simultaneously. In preferred embodiments of the invention, a third flow switch 803 is placed downstream of outlet valve 305. The third flow switch indicates whether or not water is flowing from outlet valve 305 at or above a predetermined rate. In some embodiments of the invention, for improved accuracy of the measurement of the flow through conduit 2090, third flow switch 803 is a flow transmitter.

In preferred embodiments of the invention in which the smart boiler system includes third flow switch 803, the third flow switch is in communication with the means for bringing the water from its source to the smart boiler. For example, in preferred embodiments of the invention in which the water brought to the boiler is preheated by heat exchange from warm waste water, the water heating system includes a pump (103). In preferred embodiments of the invention that incorporate third flow switch 803 and pump 103, the third flow switch sends a signal to the pump control system of the pump as long as the flow of water through valve 305 is above a predetermined minimum (which may be zero). When the signal from the third flow switch ceases, the cessation of the signal from the third flow switch causes the pump's pump control system to stop the operation of the pump. In embodiments in which the pump is controlled by level switches 210 and 215, the signal from flow switch 803 overrides the signal from level switch 215, and the pump ceases operation even if the water level is sufficiently high that the pump would normally cease operating.

When one chamber is empty and open to atmosphere and the other chamber is connected to a source of mains water, a significant pressure difference between the two chambers can develop. In order to prevent such a pressure difference from damaging the system, outlets 4150 and 4250 are connected to one another by a pair of non-return valves, arranged in parallel in opposite orientations. The non-return valves may be of any appropriate type known in the art, and are configured to open when the pressure on the inlet side exceeds the pressure on the outlet side by a predetermined amount, typically 0.5-1.0 bar. As a non-limiting example, the non-return valves may comprise a spring that requires the predetermined pressure to be compressed sufficiently to open the valve.

The smart boiler subsystem further includes a normally closed third valve 303 that is in fluid communication with conduits 2070 and 2075 via conduits 2060 and 2065, respectively. The conduits are connected at a point downstream of the pump. When valve 303 and one of valves 301 or 302 are open, the system thus provides a fluid connection between an outlet of one chamber and an inlet of the other, allowing transfer of water between the two chambers upon activation of the appropriate pump.

The smart boiler subsystem also includes means for determining when one or the other of the chambers is empty or nearly so by including volume determination means. In the embodiment of the invention illustrated in FIG. 2A, rather than explicitly measuring the volume of water in the chamber (either directly or by measuring the difference in the amount of water entering the chamber and the amount leaving), the system incorporates proximity switches at the ends of the two chambers. An actuator 440 is attached to or embedded in the flexible barrier. When the actuator makes contact with (or, in some embodiments, approaches to within a predetermined distance from) proximity sensor 441 (first chamber) or 442 (second chamber), a proximity switch (610 or 620, respectively) is actuated, sending a signal to the smart boiler subsystem control systems that the chamber in question is empty. When switch 610 is activated, the system enters a FIRST CHAMBER FILL mode, while when switch 620 is activated, the system enters a SECOND CHAMBER FILL mode. In FIRST CHAMBER FILL mode, inlet valve 304 is configured to conduct water from conduit 2040 to inlet 4510 and from there to the first chamber, and outlet valve 305 is configured to conduct water from second chamber outlet 4250 to its outlet side. Conversely, when the system is in SECOND CHAMBER FILL mode, inlet valve 304 is configured to conduct water from conduit 2040 to inlet 4520 and from there to the second chamber, and outlet valve 305 is configured to conduct water from first chamber outlet 4150 to its outlet side. Thus, when the system is in FIRST CHAMBER FILL mode, it is configured to fill the first chamber with water from the heat exchange subsystem and to draw water from the second chamber, while when the system is in SECOND CHAMBER FILL mode, it is configured to fill the second chamber with water from the heat exchange subsystem and to draw water from the first chamber.

Figure 2B:
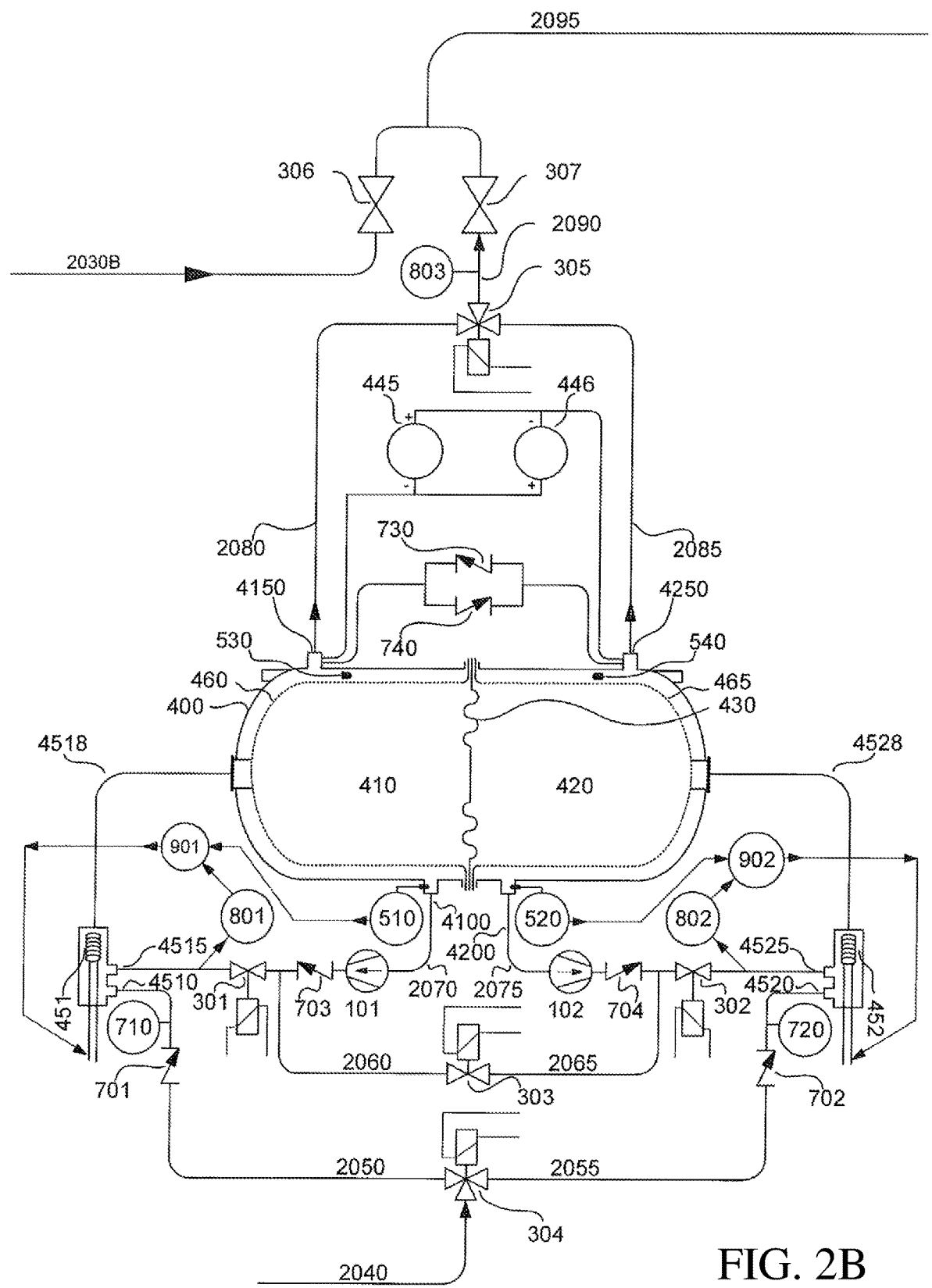
FIG. 2B presents a schematic diagram of a second non-limiting embodiment of the "smart boiler" subsystem of the invention herein disclosed; and, FIG. 3 presents a schematic diagram of one embodiment of a water delivery system according to the invention herein disclosed, in which the water delivery system comprises a heat exchange subsystem and a smart boiler subsystem.

Reference is now made to FIG. 2B, which shows a second non-limiting embodiment of the smart boiler subsystem. In the embodiment illustrated in FIG. 2B, the volume determination means comprises a pair of pressure differential switches (PDSs), a first PDS 445 and a second PDS 446, in fluid contact with the first and second chambers. Any standard type of PDS known in the art and appropriate to the pressure range of the system herein disclosed in may be used. As the first chamber empties, the flexible barrier will reach the end of its travel as it approaches grid 460. After the flexible barrier reaches the end of its travel, the pressure inside the first chamber decreases as the first chamber continues to empty without any significant change in its volume, and $\Delta P_{21}$, the difference between the pressure in the second chamber ($P_{420}$) and the pressure in the first chamber ($P_{410}$), ($\Delta P_{21}=P_{420}-P_{410}$) increases. When $\Delta P_{21}$ reaches a predetermined value, the first PDS (445) sends a signal to the control apparatus, causing the system to switch to FIRST CHAMBER FILL mode and to draw water from the second chamber. Then, as the second chamber empties and the flexible barrier reaches the end of its travel in the other direction as it nears grid 465, the pressure in the second chamber decreases as the second chamber continues to empty without any significant change in its volume, and $\Delta P_{12}$, the difference between the pressure in the first chamber and the pressure in the second chamber ($\Delta P_{12}=P_{410}-P_{420}$) increases. When $\Delta P_{12}$ reaches a predetermined value, the second PDS (446) sends a signal to the control apparatus, causing the system to switch to SECOND CHAMBER FILL mode.

FIG. 2B also illustrates an alternative arrangement of heating elements 451 and 452. In the embodiment illustrated in FIG. 2A, the heating elements are physically attached to the boiler. In some other preferred embodiments such as the one illustrated in FIG. 2B, the heating units are separated from the body of the boiler 400. Instead, the water is heated remotely from the boiler and transferred to chambers 410 and 420 via conduits 4518 and 4528, respectively. These embodiments have the advantage that by separating the heating element from the body of the boiler, the boiler can be smaller and thus more conveniently fit into a restricted volume. In addition, by separating the heating units from the body of the boiler, deposits in the boiler from precipitation of minerals such as $MgSO_4$ and $CaSO_4$ are lessened.

In preferred embodiments of the system, the smart boiler also has a temperature control apparatus. Each chamber has an associated temperature control system (510 and 520 for the first and second chambers respectively) configured determine the temperature of the water within the chambers and to turn off the relevant heater when the temperature of the water in the chamber reaches a predetermined value (typically 42° C.) and to turn it on when the water temperature is below the predetermined value. Such temperature measurement and control systems are well known in the art, and any appropriate system may be used. In preferred embodiments of the system, the temperature control apparatus also includes means for alerting the user that temperature of the water in the chamber from which it is to be drawn has reached its set point. One non-limiting example of such a means is a "READY" light that lights up when the temperature control apparatus determines that the temperature set point has been reached.

In preferred embodiments of the invention, the smart boiler subsystem incorporates at least one of the following safety features.

In some preferred embodiments of the invention, the smart boiler incorporates at least one one-way check valve to protect the system from flow of water in the wrong direction. In the embodiments illustrated in FIGS. 2A and 2B, check valves 701 and 702 are placed between the inlet valve and the respective chamber inlets 4510 and 4515, while check valves 703 and 704 are placed between first pump 101 and first valve 301 and between second pump 102 and second valve 302, respectively. These check valves will protect the system from flow of water in the wrong direction in the event of, for example, a pump failure.

In some preferred embodiments of the invention, the smart boiler subsystem additionally or alternatively incorporates pressure relief valves 710 and 720, in fluid connection with conduits 2050 and 2055, respectively. These pressure relief valves are configured to release water from the system if the pressure in the conduit exceeds a predetermined value, and serve to protect the system against overpressure in chambers 410 and 420 respectively. In some preferred embodiments of the invention, the pressure relief valves are set to release water from the system if the pressure in the conduit exceeds the maximum pressure that the components of the chambers can withstand, typically about 10 bar. Since the pressure in the conduit will be less than or equal to the pressure in the chamber to which it is connected, the relief valves will have a built-in safety factor. In some preferred embodiments of the invention, the pressure at which pressure relief valves 710 and 720 will release water from the system is somewhat lower than the maximum pressure that the components of the chambers can withstand in order to provide an additional safety factor. Additionally or alternatively, the pressure at pressure relief valves 710 and 720 can be calibrated to the pressure in chambers 410 and 420 when water is flowing through conduits 2050 and 2055. The pressure relief valves can then be set to open at a pressure in the conduit that is known to correspond to a predetermined maximum pressure in the chamber with which the conduit is connected. The design considerations for pressure relief valves 710 and 720 will depend on the specific application of the system, as one of ordinary skill in the art will readily appreciate.

In some preferred embodiments of the invention, the smart boiler subsystem a pair of non-return valves 730 and 740 that serve to prevent overpressure due to a failure in the switching of the fill mode from filling one chamber to filling the other. The inlet of the first non-return valve (730) is connected to the second outlet (4250) of the second chamber and the outlet to the second outlet (4150) of the first chamber. The inlet of the second non-return valve (740) is connected to the second outlet (4150) of the first chamber, and the outlet to the second outlet (4250) of the second chamber. Each non-return valve is configured to open when the pressure at its inlet exceeds the pressure at its outlet by a predetermined amount, typically 0.5-0.6 bar. If there is a problem with the change in the fill mode from one chamber to the other, for example, the inlet to one chamber remains open even after the chamber is full, then the flexible barrier will experience an overpressure on one side as it contacts the grid or the wall of the boiler, and is thereby physically prevented from expanding further. In this failure mode, the pressure on one side of the flexible barrier could in principle become sufficiently high as to cause a force of $10^4$ N or more on the grid or on the wall of the boiler, while the pressure on the other side remains at atmospheric pressure. If the pressure difference in the two chambers exceeds the predetermined value, then the relevant non-return valve will open, thereby creating a fluid connection between the two chambers and relieving the pressure difference between them.

In some preferred embodiments of the invention, the smart boiler subsystem incorporates as a safety feature temperature switches 530 and 540, in thermal contact with chambers 410 and 420, respectively. If the temperature in a chamber exceeds a predetermined set point (e.g. the heater is on for too long, or in the absence of water), the temperature switches sends a signal alerting the user of the situation; alternatively or additionally, the temperature sensor is in electrical connection with a cutoff switch that cuts off the electricity supply to the heater.

Figure 3:
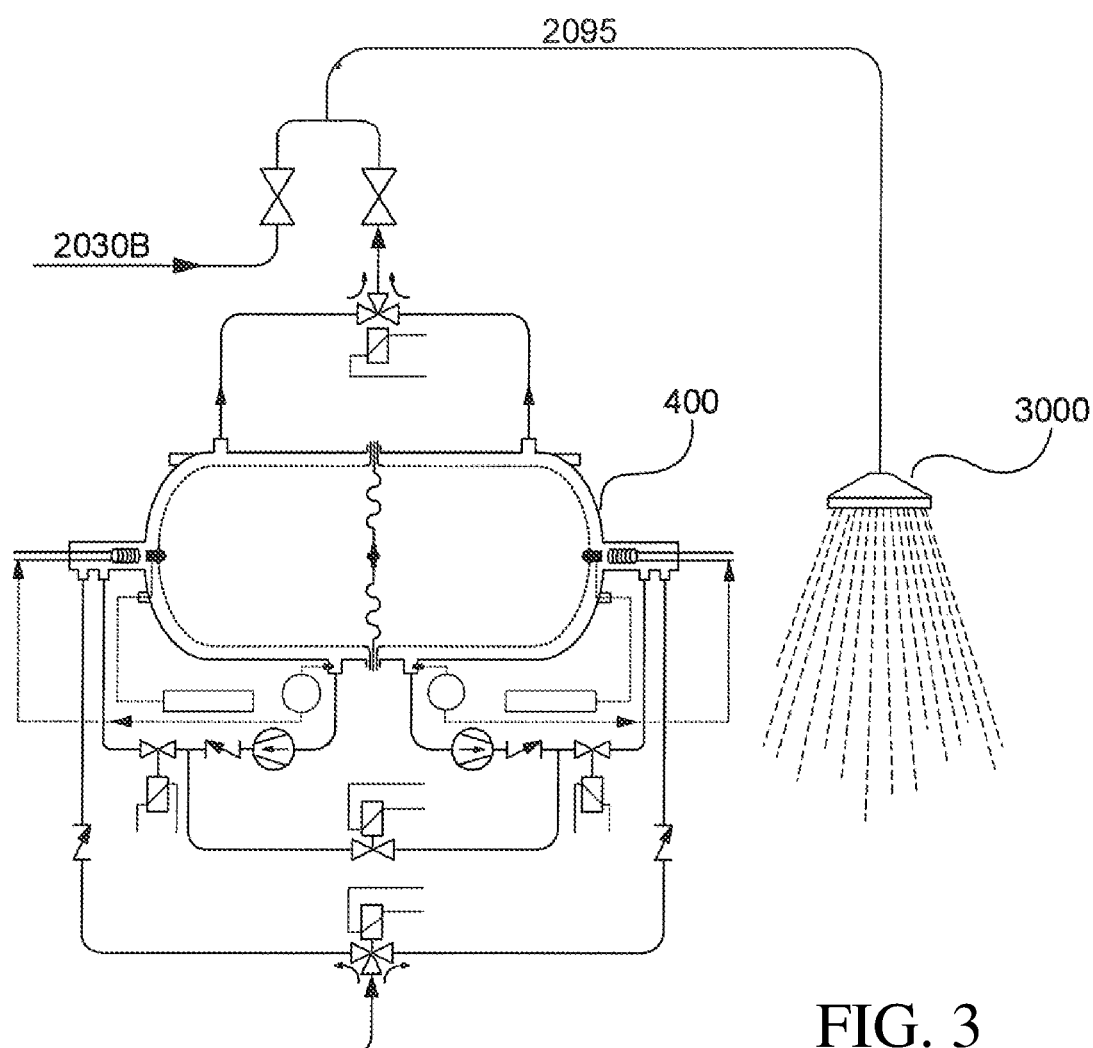
Figure 3:
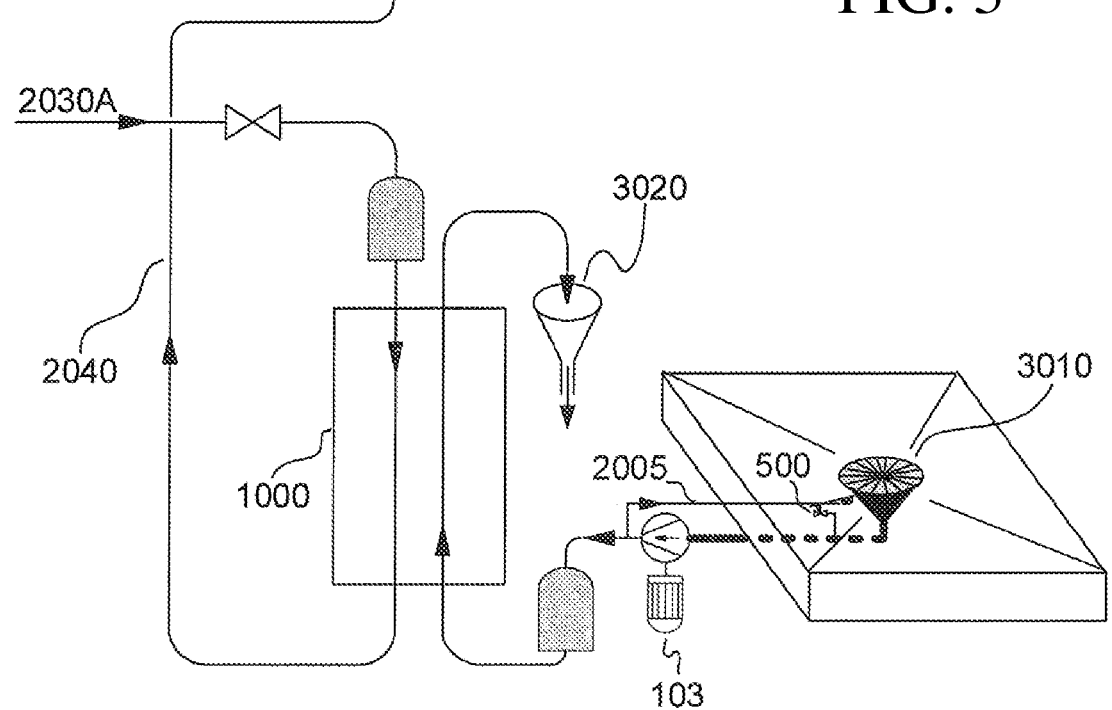

Reference is now made to FIG. 3, which shows a schematic assembly drawing of one embodiment of a water heating and delivery system comprising a heat exchange system and a smart boiler system according to the invention herein disclosed, illustrating how the system may be connected to a mains water source and a point of use such as a shower or a sink.

In typical embodiments, cold mains water enters the system through inlet 2030A, from where it passes through the heat exchange subsystem. The outlet of the heat exchange subsystem 2040 is connected to inlet valve 304 of the smart boiler subsystem, thereby allowing water that has been preheated in the heat exchange subsystem to flow into the smart boiler subsystem.

Additionally or alternatively, the boiler subsystem may also be connected directly to a source of cold mains water 2030B. In embodiments in which the smart boiler subsystem is connected directly to the cold mains water, the connections to the cold mains water and the outlet side of outlet valve 305 are in fluid connection with conduit 2095, which is configured to conduct the water to a hot water delivery outlet 3000 such as a shower head or sink faucet. When the system is connected to a point of use, mixing means for mixing the hot water produced by the system with incoming cold mains water are provided. A non-limiting example of one possible arrangement is shown in FIG. 3: outlet valve 305 is in fluid connection with a hot water valve 307 via conduit 2090, while the mains water source is in fluid connection with to a cold water valve 306. The two valves are in fluid connection with conduit 2095 such that water flowing through the two valves is mixed on its way to the hot water delivery outlet. By varying the amount by which the two valves are open, the hot water exiting the smart boiler system and the cold mains water can be mixed to provide a final desired water temperature. While in the schematic diagram given in FIG. 3, valves 306 and 307 are shown as being remote from the hot water delivery outlet, in practice, they need not be; as a non-limiting example, valves 306 and 307 can be the cold and hot water taps of a typical home shower system.

The smart boiler subsystem and the overall heating/delivery system also include general control subsystems. In preferred embodiments of the invention, the system is connected to a user interface such as a touch screen that enables the user to activate and to manage the system. In typical embodiments of the invention, the control interface presents information regarding the system controls and the status of the system and its components. The user can choose among several operating modes, perform system tests, and obtain information about the energy requirements, conduct of the system, and the results of various measurements of system data.

In preferred embodiments of the invention, the control system includes memory for individualized menus such that each user can set the system parameters according to his or her personal preference, and recall the system parameters from the particular user's previous use of the system without having to input all of them from the start. In these embodiments, the user interface offers the user the option of setting a personal menu according to the user's identity. When the user selects the option of a personal menu, a window opens on the user interface in which the user enters the desired hot water temperature. The user is then offered the option of choosing one chamber or the other as the initial water supply or to prepare a predetermined amount of hot water and the amount of water the user wishes to have supplied. The control system stores the settings under a unique user ID, and then in future uses, the user can choose the prior settings without having to cycle through the entire menu.

In some preferred embodiments of the invention, the smart boiler subsystem can be put into a STANDBY mode. When the smart boiler subsystem is in STANDBY mode, the entire system is held in its most recent state and the heating units are turned off. In preferred embodiments of the invention, means are provided by which a user can cause the system to exit STANDBY mode. Non-limiting example of such standby exit means include a manual control and a command accessible via the user interface. In the most preferred embodiments of the invention, the user is given the option of exiting STANDBY mode, which returns the system to its prior fill mode, or of exiting STANDBY mode and drawing water from the chamber of his or her choice.

In preferred embodiments of the invention, the smart boiler subsystem can be set to automatically go into STANDBY mode under certain circumstances. For example, if a predetermined amount of time passes (in typical embodiments, 30 minutes) without the fill mode switching, or alternatively if both heaters are idle (i.e. neither heater is activated) for more than a predetermined time within a predetermined time period (e.g. 5 minutes within a 30 minute time period), the smart boiler subsystem is put in STANDBY mode.

In some embodiments, the control systems can also be connected by a home internet system (e.g. by use of an Internet of Things protocol such as BRILLO) such that the water heating system can be connected to the various appliances in the home. In some embodiments, a data connection is provided between the water heating system and a cellular telephone such that system and control data can be broadcast to the cellular telephone; in these embodiments, the cellular telephone can be used to control the water heating system remotely.

In preferred embodiments of the invention, the system control subsystem is configured to allow the system to be switched to manual control, particularly for checks of the status of the various components of the system. In these embodiments, the user interface provides an option for choosing manual operation of the system. When the user selects to place the system under manual control, the system is placed in STANDBY mode, and all subsequent operations of the system are initiated manually according to specific commands given by the user. When the system is under manual control, the heaters can only be activated for a limited time (typically 7 seconds), since operation of a heater while the associated recirculating pump is not operating can damage the system. Method steps that include determination of the operating status of the system components are described in detail below.

When the system is under manual control, the user interface allows the user to open or close any or all of valves 301, 302, or 303; to open either or both of inlet valve 304 and outlet valve 305 to either the first chamber or the second chamber; or to activate or shut down any one of the pumps; or to shut down or to activate (as described above) either one of heaters 451 or 452.

In some embodiments, the water heating system also comprises apparatus for measuring the electricity used by the system; the results of the measurements are also presented to the user on the user interface. Non-limiting examples of such measurement results include a display of the total electricity consumption and/or the total electricity consumption since a measurement reset was performed; estimates of the cost of electricity used by the system; and measurement of electricity use over a period determined by the user.

In some embodiments of the invention, the user interface also includes a display of the temperature set point; the option of setting a desired temperature set point; and display of the current temperature of the water in each of the chambers in the boiler.

In some embodiments of the invention, the control system also includes a system clock that measures and stores the amount of time that each pump and each heater is actually in use. In preferred embodiments of the invention, the system clock can be reset to zero for each of the system components. In more preferred embodiments of the invention, this reset can only be performed after input of a code known only to the professional who services the system or to the professional's employer.

When the control system is activated after the water heating system has not been in use (e.g. after the electricity supply to the CPU has been interrupted), the system resets itself to a default state in which heaters 451 and 452 are off; pumps 101 and 102 are off; valves 301 and 302 are open; valve 303 is closed; inlet valve 304 is configured to create a fluid connection between its inlet and inlet 4520 to the second chamber; and outlet valve 305 is configured to create fluid connection between outlet 4150 of the first chamber and its outlet. That is, in its default configuration, the system is configured such that water entering the smart boiler subsystem will be conducted to the second chamber, while water drawn from the smart boiler subsystem will be taken from the first chamber.

It is within the scope of the invention to disclose methods of using the system disclosed herein to heat water and to provide hot water to a point of use. In general, the system operates by introducing warm waste water (e.g. gray water being drained from a shower or sink) into the heat exchanger 1000. The warm waste water, which is typically at a temperature of about 37° C., is used to heat incoming mains water in a heat exchanger, typically to about 34° C. The warmed mains water then passes to the "smart boiler" subsystem, where it is heated to a desired final temperature, typically about 42° C. The water passes to one of the two chambers, where it is heated to its desired final temperature. While the water is being heated in one of the chambers, hot water from the other chamber is provided to the point of use. When the chamber from which water is being provided is empty or nearly so, the direction of flow is switched, so that the chamber in which the water was being heated now serves as the supply of hot water to the point of use, while the chamber that was emptied is being filled with warm water from the heat exchange subsystem and heated to its final temperature.

A more detailed description of one embodiment of the method as performed on the system herein disclosed is now provided.

When the water heating system is first activated (e.g. by pressing a start button or giving a start command via a user interface), an initialization sequence is performed. In one embodiment of the invention, when the initialization sequence begins, valve 302 is closed, and valves 301 and 303 are opened. Recirculation pump 102 is activated. Any residual water left in the second chamber is thereby transferred to the first chamber. When the volume detection means determines that the second chamber is effectively empty (e.g. proximity switch 620 is activated), the system enters SECOND CHAMBER FILL mode. At this point, heater 451 is activated, valves 301 and 302 are opened, valve 303 is closed, and recirculating pumps 101 and 102 are activated. In embodiments of the invention in which the water heating system comprises temperature control means, a temperature sensor (510a, not shown separately in the figure) in thermal contact with the interior of the first chamber determines the temperature of the water within the first chamber. When the temperature of the water in the first chamber reaches a predetermined value (typically 42° C.), the temperature control means turns off heater 451, and in embodiments that comprise alerting means such as a "READY" light, an alert is given. Note that recirculating pumps 101 and 102 continue to operate even after the temperature of the water in the first chamber has reached its desired value.

Alternatively, the initialization sequence can be performed by transfer of water from the first chamber to the second chamber according to the same sequence of steps outlined above except for the use of heater 452 instead of heater 451 and temperature control means 520 instead of 510; opening and closing of valves 301 and 302 opposite to that given above; and activation of proximity switch 610 to put the system in FIRST CHAMBER FILL mode. In some preferred embodiments of the invention, the fill mode is retained in system memory, and the initialization sequence begins by inverting the fill mode, thereby emptying the chamber that was being filled. In other preferred embodiments of the invention, the user of the system can determine in which direction the transfer of water occurs during the initialization sequence by pressing an appropriate button or giving an appropriate command via the user interface.

After completion of the initialization sequence, the system begins its normal operation. The following description assumes that the initialization sequence transfers water from the second chamber to the first chamber. It will be clear, however, to one of ordinary skill in the art that the operation and method described here can be performed equally well using an initialization sequence that transfers water from the first chamber to the second chamber, with the appropriate adjustments in the opening and closing of valves, activation and shutoff of the heaters, etc.

Once the water heating system begins to operate, valve 301 opens, and water is recirculated through the first chamber, conduit 2070, and inlet 4515. In embodiments of the system in which it includes temperature control means, heater 451 is activated when the water temperature falls below a preset tolerance of the set temperature (in typical embodiments, when the temperature of the water is 0.5° C. or more below the set point), and shut off when the water reaches its set point. In some preferred embodiments of the smart boiler subsystem, it includes a shutoff mechanism. A predetermined amount of time (in typical embodiments, 30 minutes) passing without the fill mode changing is taken as an indication that no hot water is being drawn from the smart boiler. In such a case, the recirculating pumps and temperature control means are shut off, and the system is placed in STANDBY mode.

In preferred embodiments of the invention, a heater associated with a particular chamber is only activated if the recirculating pump associated with that chamber is operating. Note that under normal circumstances, both recirculating pumps are operating when water is being drawn from one of the chamber in order to enable the system to measure the water temperature in both chambers. In preferred embodiments of the invention, only one of the two heaters operates at any given time. If the temperature in both chambers is below the set point by a predetermined tolerance (typically 0.5° C. or more), preference is given to heating the water in the chamber from which water is currently being drawn in order to ensure that the water exiting the system is at the proper temperature. Thus, if the temperature in both chambers is below the set point by the predetermined tolerance and the system is in FIRST CHAMBER FILL mode (water is being drawn from the second chamber), heater 452 will be activated, while if the system is in SECOND CHAMBER FILL mode, heater 451 will be activated.

Thus, water enters one chamber or the other of the smart boiler (in the water heating system herein disclosed, from the heat exchange subsystem via conduit 2040 and inlet valve 304), where it is heated by the heater associated with that chamber, and recirculates through the chamber. For example, if the first chamber is being filled via inlet 4510, first valve 301 is opened and water is pumped by first pump 101 from outlet 4100 through conduit 2070 back to inlet 4515. Simultaneously, hot water is drawn from the chamber not currently being filled via outlet 4150 or 4250 to outlet valve 305 and from there to the eventual point of use.

As the chamber from which water is being drawn empties and the other chamber fills, flexible barrier 420 draws closer to the interior walls of the emptying chamber. When the chamber is empty or nearly empty, the volume detection means sends a signal (in preferred embodiments, a proximity switch is activated by the approach of actuator 440) causing the system to change the fill mode (i.e. from FIRST CHAMBER FILL to SECOND CHAMBER FILL or vice versa), and the fluid connections of inlet valve 304 and outlet valve 305 are reversed such that the incoming water flows to the empty chamber and water is drawn from the full chamber.

In preferred embodiments of the invention, the control system also provides means such as a button or a command accessible via the user interface by which a user can manually place the smart boiler subsystem in STANDBY mode.

With time, the efficiency of the heaters decreases due to deposits (e.g. of scale) on the body of the heater. In preferred embodiments of the invention, the method disclosed herein additionally comprises determining the efficiency of the heaters. In the most preferred embodiments of the invention, the system also incorporates means for automatically updating the control software with the test results. The tests are performed at a time when water is not being drawn from the boiler. In preferred embodiments of the invention, the determination of the efficiency of the heaters is performed as follows. The user sends a command to the system to perform the test (e.g. by sending a command accessed via the user interface) on a particular heater. The system then transfers water to the chamber the heater of which is being tested until the chamber is filled to its maximum volume; the details of how the transfer is performed are given below. The recirculating pump associated with the chamber is then activated, the heater activated for 60 seconds, and the rise in temperature of the water in the chamber is measured. Since the volume of water, temperature rise, heating time, and energy supplied to the heater are all known, the expected temperature rise (assuming that the heating is 100% efficient) can be calculated by simple thermodynamic methods well-known in the art. This expected temperature rise is compared with the actual temperature rise. In some embodiments of the system, the temperature rise is measured the first time that the system is used, and this temperature rise is used as the basis for future assessments of the efficiency of the heaters. When the efficiency decreases by a predetermined amount (in typical embodiments, by 10%), the system provides a warning that the heater efficiency has decreased significantly.

In some embodiments of the method, it additionally comprises determining whether the heaters are operating normally. As an example of how this determination is performed for the first chamber, the first chamber is filled as described above for determining the efficiency of the heaters. After the first chamber is filled, heater 451 and recirculating pump 101 are activated for a predetermined length of time, typically about 2 minutes, and the rise in temperature of the water during this time is measured. If during this time, the temperature of the water has not risen by at least a predetermined amount expected based on the volume of water in the chamber and the length of time during which the heater is activated, the control system informs the user that heater 451 is not operating normally. In embodiments in which the total volume of smart boiler 400 is 40 liters, the temperature rise will typically be more than 0.5° C. Additionally or alternatively, the analogous determination can be made for heater 452.

In some preferred embodiments of the method, it additionally comprises performing diagnostics to determine the operating condition of recirculating pumps 101 and 102, heaters 451 and 452, and the volume detection means (e.g. proximity sensors 441 and 442 or pressure differential switches 445 and 446). The diagnostics are initiated by the user sending a command to the control system, either by pressing a manual switch or via the user interface. The order in which the diagnostics are performed will depend on whether one chamber or the other is empty, or whether both have water in them. If both chambers have water in them (e.g. no signal is received from either proximity sensor or from either pressure differential switch) or if second chamber 420 is empty (e.g. a signal is received from second proximity sensor 442 or from second pressure differential switch 446), then the diagnostics begin with tests of the operating condition of first recirculating pump 101, second flow switch 802, and the volume detection means for determining the volume of the first chamber, followed by tests of second recirculating pump 102, first flow switch 801, and the volume detection means for determining the volume of the second chamber. The diagnostic procedure begins with transfer of water from the first chamber to the second chamber, as described above. It is expected that during the transfer, a signal will be received from second flow switch 802, indicating that water is flowing into the second chamber, followed by a signal from first proximity sensor 441 within a predetermined emptying time from the start of the transfer. This predetermined emptying time will be the time needed to empty the first chamber based on its volume and the flow rate through or pumping speed of recirculating pump 101; for a 40-liter boiler and typical recirculating pumps, this predetermined time will typically be about 4 minutes. The status of first recirculating pump 101, second flow switch 802, and first proximity sensor 441 can then be deduced from the signals received by the control apparatus. There are four possible cases to consider:

1. If a signal is received from second flow switch 802 followed by a signal from first proximity sensor 441 within the predetermined emptying time, then these components along with first recirculating pump 101 must all be in working condition. In this case, the user is notified (e.g. by displaying a message on the user interface, lighting status indicators, etc.) that the first recirculating pump, second flow switch, and first proximity sensor are all in proper working order.
2. If a signal is received from first proximity sensor 441 within the predetermined emptying time, but no signal is received from second flow switch 802, then it is known that first recirculating pump 101 and first proximity sensor 441 are in working condition, but that there is a fault in second flow switch 802. In this case, the user is notified that the first recirculating pump and proximity sensor are in proper working order, but that there is a fault in the second flow switch.
3. If a signal is received from second flow switch 802, but no signal is received from first proximity sensor 441 within the predetermined emptying time, then it is known that first recirculating pump 101 and second flow switch 802 are in working condition, but that there is a fault in first proximity sensor 441. In this case, the user is notified that the first recirculating pump and second flow switch are in proper working order, but that there is a fault in the first proximity sensor.
4. If the predetermined emptying time passes, but no signal has been received from either second flow switch 802 or first proximity sensor 441, then there presumably is a fault either in first recirculating pump 101 or in second valve 302, the probability that either the pump or the valve will fail being much greater than the probability that second flow switch 802 and first proximity sensor 441 will fail simultaneously. In this case, the user is notified that there is a fault either in the first recirculating pump or in the second valve.

After the diagnostics for first recirculating pump 101, first proximity switch 441, and second flow switch 802 are completed, diagnostics are performed to determine the status of second recirculating pump 102, second proximity switch 442, and first flow switch 801. These diagnostics are performed in an analogous fashion, with water being transferred from the second chamber to the first chamber, and the status of these components deduced from the signals received (or not received) from second proximity switch 442 and first flow switch 801.

If first chamber 410 is empty (i.e. a signal is received from first proximity sensor 441) when the diagnostics begin, then the diagnostics are performed in the opposite order, i.e. the procedure is performed to determine the status of second recirculating pump 102, second proximity switch 442, and first flow switch 801, followed by the procedure to determine the status of first recirculating pump 101, first proximity switch 441, and second flow switch 802.

In some embodiments of the method, it comprises automatically determining whether a recirculating pump and the flow switch downstream of the pump are operating normally. This automatic determination is performed while a recirculating pump is operating to recirculate water to a particular chamber rather than during transfer of water from one chamber to the other. A test the status of pump 101 can be performed whenever pump 101 has been in operation, and valve 301 has been open, for a predetermined pre-test period, typically at least 10 seconds. A failure to receive a signal from flow switch 801 indicates that there is a problem with either the pump or with the flow switch. In this case, the activation of heater 451 is blocked and the control system informs the user (e.g. via a message on the user interface) of a fault in the recirculation path. The exact determination of the faulty component is performed as described above.

In some preferred embodiments of the invention, the method disclosed herein comprises determining the volume of water within each chamber. The control system is configured to allow these measurements to be made only while the system is in STANDBY mode; in some embodiments, the user can direct the system to make this measurement by a command accessible from the user interface, or by a manual switch or button. The measurement is performed as follows. Valves 301 and 302 are opened and recirculating pumps 101 and 102 activated. The control system first determines the amount of water contained in the first chamber, and then determines the amount of water contained in the second chamber separately, since the determination is made with a heater on, and only one heater can be activated at any given time. The volume of water in a given chamber is determined as follows. The heater and recirculating pump associated with the chamber are activated together. The control system then measures the time necessary to raise the temperature by a predetermined amount, typically 0.5° C. This time is proportional to the amount of heat delivered to the system and to the amount of water in the chamber. Since the amount of heat delivered to the water by the heater is known from the method described above, and the amount of time is measured explicitly, calculation of the amount of water in the chamber is straightforward. In preferred embodiments of the invention, the results of these measurements are provided to the user via the user interface. In preferred embodiments of the invention, the volume of water in the chamber is displayed on the user interface.

In some preferred embodiments of the invention, the method disclosed herein comprises measuring the flow rate of water passing through the recirculating pumps. In some embodiments of the invention, this determination is made from the specifications of the pump as received from the manufacturer. In some preferred embodiments of the invention, the delivery of water by the recirculating pumps is performed by measuring the time it takes to transfer water from a full chamber to an empty one by the method described above. The time from the cessation of the signal indicating that one chamber is empty until a signal indicating that the other is empty is measured. Since the volume of water and the time needed to transfer it are known, calculation of the delivery of the water by the pump is straightforward. The control system performs this calculation and reports the results to the user via the user interface, stores the results in memory, or both.

In some preferred embodiments of the invention, the method comprises preparing a predetermined amount of water for use at a predetermined temperature. In this case, the water is drawn from the chamber defined as the one providing water to the point of use (i.e. if the system is in FIRST CHAMBER FILL mode, the water will be drawn from the second chamber and vice versa). In preferred embodiments of the invention, the user activates the preparation of the predetermined amount of water either by a command via the user interface or by a manual switch or button; in the most preferred embodiments of the invention, the user chooses from which chamber the water will be drawn. The user indicates (via the user interface) the amount and temperature of the water to be drawn, and the system then prepares the water for use. First, the temperature and volume of the water within the selected chamber are determined as described above. The control system then calculates the amount of water that needs to be added to or taken from the chosen chamber in order that the chamber will contain the desired volume of water. The control system then calculates the time needed to transfer the water to or from the chamber from the amount of water needed to be added or removed and the known pumping speed of the recirculating pump (either pump 101 or 102, depending on the required flow direction). Valve 303 is opened and the appropriate recirculating pump is then activated for the calculated time. After the water has been transferred, the temperature and amount of water in each chamber are again measured. If more than a predetermined amount (typically 5 liters) of water needs to be transferred to or from the chamber, an additional transfer is performed. The recirculating pump associated with the chamber from which the water is to be taken is activated and the corresponding valve (301 or 302) is opened. The appropriate heater is then activated and the water heated and recirculated until it reaches the predetermined temperature. In preferred embodiments of the invention, once the water has reached the predetermined temperature, the user is alerted, e.g. by lighting of a "READY" light, indicating that the water is ready for use.

In some preferred embodiments of the invention, the method comprises alerting the user that the amount of heated water in the smart boiler has reached a minimum value, thereby providing the user with a warning that cessation of the supply of hot water at the point of use is imminent in order that the user can plan to finish the use of the water before the hot water runs out.

In one embodiment of the method, alerting the user is performed by providing a rough estimation the amount of water remaining in the chamber through use of a flow switch. This embodiment of the method makes use of preferred embodiments of the system in which it comprises flow switch 803. In this embodiment of the method, when the user begins to draw water from the system, a signal is produced by flow switch 803 that determines whether the flow exiting outlet valve 305 exceeds a predetermined rate, typically 6 L/min. The user can set via the user interface a desired flow rate. Since a shower typically has a flow rate of 8-10 L/min, a typical desired flow rate will be about 9 L/min. The control system determines the flow rate and divides it into the amount of time necessary to provide 1 liter (e.g. at a flow rate of 9 L/min, the time needed to supply 1 L is 6⅔ s), and calculates the amount of heated water remaining in the chamber from the amount of water prepared and the measured time during which the water has been supplied. When the estimated time remaining until the water runs out (at the flow rated set by the user), the control system provides a warning signal that the amount of water remaining has fallen below the set minimum.

In various embodiments of the invention, this warning signal is visual (e.g. a flashing light), aural (e.g. a buzzer), or both. In some embodiments of the invention, the warning signal is powered by a battery. In preferred embodiments in which the warning signal is powered by a battery, the system also contains means for measuring the battery voltage and for providing an alert (e.g. a warning light or buzzer) when the battery voltage is below a predetermined minimum and battery replacement is therefore recommended.

In a second embodiment of the method, alerting the user is performed by providing an approximate measurement of the amount of water in the chamber from which water is being drawn. This embodiment for alerting the user is performed during a pause in the supply of water from the smart boiler. In this embodiment, the determination of the amount of water in the chamber is performed thermally by activation of the heater associated with the chamber being filled by water from the heat exchange unit or by mains water; the measurement is not performed directly on the chamber from which water is being drawn in order not to interfere with the temperature of the water that was prepared for use. After the use of the predetermined amount of water at a predetermined temperature has begun (in preferred embodiments, as determined by the detection of water flow by flow switch 803 and/or by detection of a change in the signal produced by the volume determination means associated with the chamber from which water is being drawn), the control system pauses until there is a cessation of the supply of water (e.g. flow switch 803 indicates no water is exiting outlet valve 305). The recirculating pump associated with the chamber being filled is activated for a predetermined length of time (typically 20 seconds) in order to ensure that the temperature of the water within the chamber is homogeneous. During this time, the water temperature is sampled, the heater activated, and the volume of water within the chamber estimated as described above. Once the volume of water in the chamber being filled has been determined, the volume of water in the chamber from which water is being drawn is estimated as the difference between the total volume of the boiler and the volume of water in the chamber being filled.

If during the measurement of the water volume in the chamber according to this second embodiment, the supply of water resumes, the measurement is cancelled and the control system pauses the measurement until there is once again a pause in the supply of water from the smart boiler.

When the amount of water in the chamber is estimated to have reached a predefined minimum, the user is alerted as described above.

I claim:

1. A smart boiler system, comprising:
a first chamber (410) comprising a first inlet (4510), a second inlet (4515), a first outlet (4100), and a second outlet (4150);
a second chamber (420) comprising a first inlet (4520), a second inlet (4525), a first outlet (4200), and a second outlet (4250);
a first back pressure control valve (730) comprising:
an inlet in fluid connection with said second outlet (4250) of said second chamber (420);
an outlet in fluid connection with said second outlet (4150) of said first chamber (410); and
a first one-way valve configured to open when pressure at said inlet exceeds pressure at said outlet by a predetermined amount;
a second back pressure control valve (740) comprising:
an inlet in fluid connection with said second outlet (4150) of said first chamber (410); and
an outlet in fluid connection with said second outlet (4250) of said second chamber (420);
said second back pressure control valve configured to open when pressure at said inlet exceeds pressure at said outlet by a predetermined amount;
a flexible barrier (430) separating said first chamber and said second chamber;
a first heater (451) in thermal contact with said inlets to said first chamber;
a second heater (452) in thermal contact with said inlets to said second chamber;
a first recirculating pump (101) configured to pump fluid from said first chamber outlet (4100) to said first chamber inlet (4515) through a normally-open first valve (301) via a conduit (2070);
a second recirculating pump (102) configured to pump fluid from said second chamber outlet (4200) to said second chamber inlet (4525) through a normally-open second valve (302) via a conduit (2075);
volume detection means for determining when said flexible barrier approaches within a predetermined distance of an interior surface of a chamber selected from said first chamber and said second chamber, said volume detection means configured to provide a signal when at least one condition selected from the following group of conditions is met:
said flexible barrier is determined to have approached to within said predetermined distance of the interior surface of said selected chamber;
said flexible barrier is determined to have reached a predetermined limit of its travel;
said volume detection means determines that said selected chamber is characterized by a volume consistent with approach of said flexible barrier to within said predetermined distance of the interior surface of said selected chamber; and
said volume detection means determines that one of said chambers is effectively empty;
a normally closed third valve (303), one side of which is connected to conduit (2070) via conduit (2060) at a point downstream of said first recirculating pump (101), and a second side of which is connected to conduit (2075) via conduit (2065) at a point downstream of said second recirculating pump (102);
a three-way inlet valve (304), comprising:
an inlet;
a first outlet in fluid connection with first chamber inlet (4510) via a conduit (2050); and
a second outlet in fluid connection with second chamber inlet (4520) via a conduit (2055);
a three-way outlet valve (305), comprising:
a first inlet in fluid connection with first chamber outlet (4150) via a conduit (2080);
a second inlet in fluid connection with second chamber outlet (4250) via a conduit (2085); and
an outlet;
a heating control subsystem, said heating control subsystem comprising:
a first temperature control means (510) configured to measure temperature within said first chamber (410) and to control said first heater (451); and
a second temperature control means (520) and configured to measure temperature within said second chamber (420) and to control said second heater (452); and,
control means configured to set said valves (301), (302), (303), and (304) to conduct water to one of said first chamber and said second chamber in response to a signal either from said volume detection means or from a user.

2. The smart boiler system according to claim 1, wherein said volume detection means comprises:
a first proximity sensor (441) located within said first chamber (410) and in electrical connection with a first switch (610);
a second proximity sensor (442) located within said second chamber (420) and in electrical connection with a second switch (620); and
an actuator (440) attached to or embedded in said flexible barrier (430) such that when said actuator approaches to within a predetermined distance of one of said two proximity sensors, said proximity sensor is activated, thereby activating said switch in electrical connection therewith and sending a signal to said control means to set said valves (301), (302), (303), and (304) to conduct water to the chamber within which said proximity sensor has been activated.

3. The smart boiler system according to claim 1, wherein said volume detection means comprises:
a first pressure differential switch (445) in fluid connection with said first chamber (410) and with said second chamber (420) and in electrical connection with said control means, said first pressure differential switch configured to measure a difference between pressure inside said first chamber and said second chamber and to send a signal to said control means to set said valves (301), (302), (303), (304) and (305) to conduct water to said first chamber if said pressure difference falls below a predetermined value; and
a second pressure differential switch (446) in fluid connection with said first chamber (410) and with said second chamber (420) and in electrical connection with said control means, said second pressure differential switch configured to measure a difference between pressure inside said second chamber and said first chamber and to send a signal to said control means to set said valves (301), (302), (303), (304)

and (305) to conduct water to said second chamber if said pressure difference falls below a predetermined value.

4. The smart boiler system according to claim 1, wherein at least one of the following is true:
said first temperature control means (510) is configured to control said first recirculating pump (101) and said first valve (301), and said second temperature control means (520) is configured to control said second recirculating pump (102) and said second valve (302); and
said smart boiler system comprises a first grid (460) disposed about said interior surface of said first chamber (410) and a second grid (465) disposed about said interior surface of said second chamber (420).

5. The smart boiler system according to claim 1, comprising at least one one-way check valve selected from the group consisting of:
a first check valve (701) located between said inlet valve (304) and said first chamber inlet (4510);
a second check valve (702) located between said inlet valve (304) and said second chamber inlet (4520);
a third check valve (703) located between said first pump (101) and said first valve (301) upstream of said connection between conduits (2060) and (2070); and
a fourth check valve (704) located between said second pump (102) and said second valve (302) upstream of said connection between conduits (2065) and (2075);
wherein said smart boiler system comprises:
a first pressure relief valve (710) in fluid communication with conduit (2050), configured to release pressure by discharging water from said conduit (2050) if water pressure in said conduit (2050) exceeds a preset set point; and
a second pressure relief valve (720) in fluid communication with conduit (2055), configured to release pressure by discharging water from said conduit (2055) if water pressure in said conduit (2055) exceeds a preset set point;
wherein said smart boiler system comprises at least one indicator configured to inform a user that water within at least one of said first chamber and said second chamber is at a predetermined temperature; and
wherein said control means comprises a user interface.

6. The smart boiler system according to claim 5, wherein said user interface comprises at least one of the following:
a display of a volume of water in at least one of said two chambers (410, 420);
a display of a temperature set point;
an option of setting a desired temperature set point;
display of the current temperature of the water in each of said chambers; and
memory for individualized menus that are configured to permit individual users to input and store system operating parameters.

7. The smart boiler system according to claim 1, comprising:
a first temperature switch (530) in thermal contact with said first chamber (410); and
a second temperature switch (540) in thermal contact with said second chamber (420).

8. The smart boiler system according to claim 1, comprising:
a first flow switch (801), configured to determine whether water is flowing through conduit (2070);
a second flow switch (802), configured to determine whether water is flowing through conduit (2075); and
a third flow switch (803), configured to determine whether there is a flow of water exiting said outlet valve (305).

9. The smart boiler system according to claim 1, wherein said first heater (451) and said second heater (452) are located remotely from said boiler (400), and said smart boiler system comprises:
a first heater conduit (4518) in fluid connection with said first chamber inlet (4510) and said first chamber (410); and
a second heater conduit (4528) in fluid connection with said second chamber inlet (4520) and said second chamber (420).

10. The smart boiler system according to claim 1, wherein at least one of the following is true:
said system is characterized by a default state in which said heaters and said pumps are off; first and second valves (301) and (302) are open; third valve (303) is closed; inlet valve (304) is configured to create a fluid connection between its inlet and inlet (4520) of said second chamber; and, outlet valve (305) is configured to create a fluid connection between its outlet and said outlet (4150) of said first chamber,
said system is configured such that first heater (451) cannot operate if said first pump (101) is not operating and said second heater (452) cannot operate if said second pump (102) is not operating, and
said system is configured such that only one of said two heaters can operate at any given time.

11. The smart boiler system according to claim 10, wherein if water in both of said two chambers is characterized by a temperature of at least a predetermined amount below a predetermined temperature:
if said second valve (302) is open and said first valve (301) is closed, said second heater (452) is activated and said first heater (451) is shut off; and
if said first valve (301) is open and said second valve (302) is closed, said first heater (451) is activated and said second heater (452) is shut off.

12. The smart boiler system according to claim 1, wherein at least one of the following is true:
said control means is configured to determine an efficiency of each of said heaters (451) and (452);
said control means is configured to whether each of said heaters (451) and (452) is operating normally; and
said control means is configured:
if said second valve (302) is open and said first valve (301) is closed, to determine whether said second pump (102) and said second flow switch (802) are operating properly; and
if said first valve (301) is open and said second valve (302) is closed, to determine whether said first pump (101) and said first flow switch (801) are operating properly.

13. The smart boiler system according to claim 1, wherein at least one of the following is true:
said control means is configured to determine a volume of water in each of said chambers; and
said control means is configured to calculate the time necessary to raise a temperature of water in a predetermined one of said chambers by a predetermined temperature.

14. The smart boiler system according to claim 1, wherein at least one of the following is true:

said control means is configured to alert a user that a volume of heated water in said boiler has reached a predetermined minimum value for a first time after said system has been initialized or after said system has passed through a system status of STANDBY;

said first back pressure control valve (730) and said second back pressure control valve (740) are configured to open when pressure at said inlet exceeds pressure at said outlet by at least 0.5 bar, at least one of said first chamber (410), said second chamber (420), said flexible barrier (430), said first grid (460), and said second grid (465) is constructed of a material that can withstand a pressure of 2 atmospheres without being permanently damaged, and at least one of said first chamber (410), said second chamber (420), said flexible barrier (430), said first grid (460), and said second grid (465) is constructed of a material that can withstand repeated cycles of pressurization to 2 atmospheres and depressurization to atmospheric pressure without being permanently damaged.

15. A water heating system, wherein said water heating system comprises:
   a heat exchange subsystem, comprising:
      a heat exchange apparatus (1000) comprising:
         a cold side (1010) comprising a cold side inlet (1030) and a cold side outlet (1040); and
         a hot side (1020) comprising a hot side inlet (1050) and a hot side outlet (1060);
      a supplementary heating subsystem comprising a smart boiler system according to any one of claims 1-14;
      a conduit (2040) providing a fluid connection between said outlet of said cold side of said heat exchange apparatus (1040) and said inlet of said three-way inlet valve (304); and
      a system control subsystem configured to control flow of water through said water heating system.

16. A hot water delivery system for providing hot water to a water delivery outlet (3000) at a point of use, wherein said hot water delivery system comprises:
   a drain (3010);
   a water heating system according to claim 5;
   a drain conduit (2010) providing a fluid connection between said drain (3010) and said inlet (1050) to said hot side of said heat exchanger (1000);
   a system drain (3020);
   a conduit (2020) providing a fluid connection between said outlet (1060) of said hot side of said heat exchanger and said system drain;
   a fluid connection between said inlet (1030) of said cold side of said heat exchanger and a source of mains water (2030A);
   a first mains valve (300) between said source of mains water and said inlet of said cold side of said heat exchanger;
   mixing means for mixing water flowing out of said outlet valve (305) with incoming water from a source of mains water (2030B); and
   a conduit (2095) configured to conduct water from said mixing means to said water delivery means.

17. A method for providing hot water to a point of use, said point of use comprising a water delivery outlet (3000) and a drain (3010), wherein said method comprises:
   obtaining a water heating system according to claim 5;
   defining a system state "FIRST CHAMBER FILL" as the system state set following production of a signal by said volume detecting means indicating that said flexible barrier is within a predetermined distance of an interior surface of said first chamber;
   defining a system state "SECOND CHAMBER FILL" as the system state set following production of a signal by said volume detecting means indicating that said flexible barrier is within a predetermined distance of an interior surface of said second chamber;
   defining a system state "STANDBY MODE" as a system state in which said heaters and pumps are turned off and all other system components remain in their most recent state;
   providing fluid connections between:
      said drain and said inlet (1050) of said hot side of said heat exchanger;
      said outlet (1060) of said hot side of said heat exchanger and a system drain (3020);
      said inlet (1030) of said cold side of said heat exchanger and a source of mains water (2030A);
      said water delivery outlet and said outlet of said three-way outlet valve (305) via conduit (2095); and
      said water delivery outlet and a source of mains water (2030B);
   initializing said system by:
      opening said first valve (301) and said third valve (303);
      pumping water from said second chamber (420) to said first chamber (410) until a signal is obtained from said volume detecting means indicating that said flexible barrier is within said predetermined distance of said interior surface of said second chamber, thereby setting said system state to SECOND CHAMBER FILL;
      closing said third valve;
      activating said first heater (451); and
      recirculating water from said first chamber (410) via said first chamber outlet (4100), conduit (2070), and said first chamber inlet (4515) until water in said first chamber has reached a predetermined temperature;
   simultaneously flowing warm waste water from said drain (3010) through said hot side of said heat exchanger and cold mains water from said source of mains water (2030A) through said cold side of said heat exchanger thereby transferring heat from said warm waste water to said cold mains water and producing warm mains water;
   flowing said warm mains water via conduit (2040) via said three-way inlet valve (304);
   if said system state is FIRST CHAMBER FILL:
      setting said three-way inlet valve (304) to provide a fluid connection between conduit (2040) and conduit (2050);
      setting said three-way outlet valve (305) to provide a fluid connection between said second chamber (420) and said outlet of said three-way outlet valve;
      activating said first heater (451);
      opening said first valve (301);
      opening said second valve (302);
      activating said first recirculating pump (101), thereby recirculating water from said first chamber through said conduit (2070) and heating said water flowing into said first chamber and/or said water being recirculated through said first chamber and said conduit (2070); and
      activating said second recirculating pump (102);
   if said system state is SECOND CHAMBER FILL:

setting said three-way inlet valve (304) to provide a fluid connection between conduit (2040) and conduit (2055);

setting said three-way outlet valve (305) to provide a fluid connection between said first chamber (410) and said outlet of said three-way outlet valve;

activating said second heater (452);

opening said second valve (302);

opening said first valve (301);

activating said second recirculating pump (102), thereby recirculating water from said second chamber through said conduit (2075) and heating said water flowing into said second chamber and/or said water being recirculated through said second chamber and said conduit (2075); and activating said first recirculating pump (101);

flowing water from said smart boiler to said outlet of said three-way outlet valve;

mixing said water flowing from said outlet of said three-way outlet valve with cold water from a mains water source (2030B) as needed to cool said water from said smart boiler to a desired final temperature; and flowing water from said three-way outlet valve via conduit (2095) to said water delivery outlet (3000).

\* \* \* \* \*

UNITED STATES PATENT AND TRADEMARK OFFICE
CERTIFICATE OF CORRECTION

PATENT NO. : 10,859,276 B2
APPLICATION NO. : 16/091771
DATED : December 8, 2020
INVENTOR(S) : Aharon Braier Page 1 of 1

It is certified that error appears in the above-identified patent and that said Letters Patent is hereby corrected as shown below:

In the Claims

Column 39, Line 9, "by at least 0.5 bar," should be changed to --by at least 0.5 bar;--.

Column 39, Line 14, "being permanently damaged," should be changed to --being permanently damaged;--.

Column 39, Line 41, "according to claim 5" should be --according to claim 15--.

Column 39, Line 63, "according to claim 5" should be --according to claim 15--.

Signed and Sealed this
Twenty-sixth Day of July, 2022

Katherine Kelly Vidal
*Director of the United States Patent and Trademark Office*